US011792677B2

(12) United States Patent
Liu et al.

(10) Patent No.: US 11,792,677 B2
(45) Date of Patent: Oct. 17, 2023

(54) REFLECTIVE QUALITY OF SERVICE FOR ENCAPSULATING SECURITY PAYLOAD PACKETS

(71) Applicant: QUALCOMM Incorporated, San Diego, CA (US)

(72) Inventors: Feilu Liu, San Diego, CA (US); Can Zhao, San Diego, CA (US); Suli Zhao, San Diego, CA (US); Alok Mitra, San Diego, CA (US); Vinay Paradkar, Broomfield, CO (US); Rushil Gholap, San Diego, CA (US); Xinli Song, San Diego, CA (US); Liping Shen, San Diego, CA (US); Rajashekar Chilla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/451,976

(22) Filed: Oct. 22, 2021

(65) Prior Publication Data

US 2023/0128433 A1 Apr. 27, 2023

(51) Int. Cl.
*H04W 28/02* (2009.01)
*H04W 12/03* (2021.01)
(Continued)

(52) U.S. Cl.
CPC ......... *H04W 28/0268* (2013.01); *H04L 47/20* (2013.01); *H04L 47/2475* (2013.01);
(Continued)

(58) Field of Classification Search
None
See application file for complete search history.

(56) References Cited

U.S. PATENT DOCUMENTS

2010/0138560 A1* 6/2010 Kivinen ............ H04L 61/2514
709/246
2020/0275302 A1 8/2020 Youn et al.
(Continued)

FOREIGN PATENT DOCUMENTS

CN 111869172 * 9/2018
WO WO2012065499 * 5/2012

OTHER PUBLICATIONS

G. Ciccarese, M. De Blasi, S. Elia, C. Palazzo and L. Patrono, "LIFT: a Local IPSec-aware Freezing Protocol to improve TCP Performance in Satellite Networks," in Journal of Communications Software and Systems, vol. 2, No. 4, pp. 347-355, Apr. 2017, doi: 10.24138/jcomss.v2i4.280 (Year: 2017).*
(Continued)

*Primary Examiner* — Andre Tacdiran
(74) *Attorney, Agent, or Firm* — Harrity & Harrity, LLP

(57) ABSTRACT

In a wireless network, a user equipment (UE) may support reflective quality of service (QoS), where QoS applied to uplink packets is implicitly derived from downlink packets. For example, when the UE receives a downlink packet that includes a reflective QoS (RQoS) indicator and a QoS flow identifier (QFI), the UE may apply the same QoS associated with the downlink packet to an uplink packet with one or more attributes that match the downlink packet. However, for a received downlink encapsulating security payload (ESP) packet that includes an RQoS indicator and a QFI, a modem cannot determine an uplink security parameters index (SPI) and downlink SPI pairing needed to enable RQoS because the uplink/downlink SPI pairing is known only by the upper layer. Accordingly, some aspects described herein enable the modem to learn uplink/downlink SPI pairings for ESP packets and thereby enable RQoS for ESP packets.

30 Claims, 17 Drawing Sheets

(51) Int. Cl.
*H04L 47/20* (2022.01)
*H04L 47/2475* (2022.01)
*H04L 9/40* (2022.01)

(52) U.S. Cl.
CPC ......... *H04L 63/0428* (2013.01); *H04W 12/03* (2021.01); *H04L 63/164* (2013.01); *H04L 2212/00* (2013.01)

(56) References Cited

U.S. PATENT DOCUMENTS

| | | | |
|---|---|---|---|
| 2020/0404533 A1* | 12/2020 | Nilsson | H04W 28/0268 |
| 2021/0045008 A1* | 2/2021 | Bajko | H04W 12/03 |
| 2021/0306275 A1* | 9/2021 | Ke | H04W 28/0268 |
| 2021/0306912 A1 | 9/2021 | Stojanovski et al. | |
| 2023/0029064 A1* | 1/2023 | Gupta | H04L 12/4633 |

OTHER PUBLICATIONS

International Search Report and Written Opinion—PCT/US2022/076098—ISA/EPO—dated Jan. 12, 2023.
Partial International Search Report—PCT/US2022/076098—ISA/EPO—dated Nov. 21, 2022.

* cited by examiner

| DL SDAP header (1 Byte) | IPv4 header | | | | | | | Encapsulating Security Payload (ESP) header |
|---|---|---|---|---|---|---|---|---|
| Reflective QoS Indicator (RQI) (1 bit) = 1 | QoS Flow ID (QFI) (6 bits) = 3 | | | | | | | |
| | Version (4 bits) | Header Length (4 bits) | ... | Protocol (8 bits) = 50 (i.e., ESP) | ... | Source Address (32 bits) = 10.10.10.10 | Destination Address (32 bits) = 20.20.20.20 | ... | Security Parameters Index (SPI) (32 bits) = 10 | ... |
| ... | | | | | | | | |

REFLECTIVE QUALITY OF SERVICE FOR ENCAPSULATING SECURITY PAYLOAD PACKETS

FIELD OF THE DISCLOSURE

Aspects of the present disclosure generally relate to wireless communication and to techniques and apparatuses associated with reflective quality of service (RQoS) for encapsulating security payload (ESP) packets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

In a wireless network, a user equipment (UE) may support reflective quality of service (QoS), where QoS applied to uplink packets is implicitly derived from downlink packets. For example, when the UE receives a downlink packet that includes a reflective QoS (RQoS) indicator and a QoS flow identifier (QFI), the UE may apply the same QoS associated with the downlink packet to an uplink packet with one or more attributes that match the downlink packet (e.g., an uplink source Internet Protocol (IP) address that matches a downlink destination IP address, an uplink destination IP address that matches a downlink source IP address, an uplink source port number that matches a downlink destination port number, an uplink destination port number that matches a downlink source port number, and/or an uplink protocol that matches a downlink protocol). However, for a received downlink encapsulating security payload (ESP) packet that includes an RQoS indicator and a QFI, a modem cannot determine an uplink security parameters index (SPI) and downlink SPI pairing needed to enable RQoS because the uplink/downlink SPI pairing is known only by an upper layer (e.g., an IP security (IPsec) layer). For example, uplink ESP packets are typically generated by the IPsec layer (above an IP layer) after a security association is established (e.g., in an application processor). The security association may be separate for uplink and downlink packets, whereby uplink ESP packets and downlink ESP packets for a bi-directional data flow may use different SPI values. Accordingly, because there is no predefined correlation between uplink SPI values and downlink SPI values, only the upper layer explicitly knows the uplink SPI and downlink SPI pairing. In such cases, because the modem does not have the uplink SPI parameter needed to create or otherwise derive a non-access stratum (NAS) RQoS uplink packet filter, a UE may be unable to utilize RQoS to determine which QoS to apply for uplink ESP packets without specific signaling.

Some aspects described herein relate to techniques and apparatuses to enable a modem to learn an uplink/downlink SPI pairing for ESP packets and thereby enable RQoS for ESP packets. For example, in some aspects, the modem may monitor ESP packets on a protocol data unit (PDU) session with NAS RQoS enabled, and may store a record for each ESP packet associated with a unique combination of attributes (e.g., a unique 3-tuple including a local IP address, a remote IP address, and an uplink SPI value). The record may further include a downlink SPI field and a flag or indication that the uplink SPI is not mapped to a downlink SPI value. Accordingly, when the modem receives a downlink ESP packet and there is only one stored record that satisfies a set of mapping conditions with respect to the downlink ESP packet (e.g., there is one record that includes a local IP address and remote IP address matching the local IP address and remote IP address included in the downlink packet and/or a flag indicating that the uplink SPI is not mapped to a downlink SPI value, among other examples), the modem may update the one matching record to include a downlink SPI value included in the downlink ESP packet and to change the value of the flag to indicate that the uplink SPI is mapped to a downlink SPI value. Additionally, or alternatively, in cases where the modem and the upper layer that generates the uplink ESP packets are able to exchange control information, the modem may query the upper layer to request the uplink SPI paired with an unmapped downlink SPI included in a header of a downlink ESP packet. In this way, the UE may create an uplink packet filter to indicate that uplink ESP packets with the same local IP address, remote IP address, and uplink SPI are associated with a QFI included in a downlink ESP packet associated with the downlink SPI paired with the uplink SPI. In this way, by learning the uplink and downlink SPI pairing, the UE may enable RQoS for ESP packets.

Some aspects described herein relate to a UE for wireless communication. The UE may include a memory and one or more processors coupled to the memory. The one or more processors may be configured to store a record including a first set of attributes associated with an uplink ESP packet sent by an upper layer of the UE, wherein the first set of attributes includes an uplink SPI included in a header of the uplink ESP packet and a flag indicating that the uplink SPI is not mapped to a downlink SPI. The one or more processors may be configured to receive a downlink ESP packet associated with a second set of attributes, wherein the second set of attributes includes a downlink SPI included in a header of the downlink ESP packet. The one or more processors may be configured to map the uplink SPI associated with the uplink ESP packet with the downlink SPI associated with the downlink ESP packet based at least in part on the record that includes the uplink SPI satisfying one or more conditions.

Some aspects described herein relate to a UE for wireless communication. The UE may include a memory and one or more processors coupled to the memory. The one or more processors may be configured to receive a downlink ESP packet, wherein the downlink ESP packet is associated with a local IP address, a remote IP address, and a downlink SPI that is not mapped to an uplink SPI. The one or more processors may be configured to provide, to the upper layer, a query that includes the local IP address, the remote IP address, and the downlink SPI. The one or more processors may be configured to receive, from the upper layer, a reply to the query, wherein the reply indicates an uplink SPI paired with the local IP address, the remote IP address, and the downlink SPI associated with the downlink ESP packet. The one or more processors may be configured to map the downlink SPI associated with the downlink ESP packet with the uplink SPI indicated in the reply to the query.

Some aspects described herein relate to a UE for wireless communication. The UE may include a memory and one or more processors coupled to the memory. The one or more processors may be configured to determine, based at least in part on receiving a configuration message or deriving a new QoS flow to data radio bearer (DRB) mapping rule, that a DRB mapping rule associated with a QoS flow identifier (QFI) has changed. The one or more processors may be configured to refrain from transmitting an end-marker service data adaptation protocol (SDAP) control PDU on a current DRB associated with the QFI based at least in part on determining that the QFI is not associated with an uplink packet filter.

Some aspects described herein relate to a method of wireless communication performed by a UE. The method may include storing a record including a first set of attributes associated with an uplink ESP packet sent by an upper layer of the UE, wherein the first set of attributes includes an uplink SPI included in a header of the uplink ESP packet and a flag indicating that the uplink SPI is not mapped to a downlink SPI. The method may include receiving a downlink ESP packet associated with a second set of attributes, wherein the second set of attributes includes a downlink SPI included in a header of the downlink ESP packet. The method may include mapping the uplink SPI associated with the uplink ESP packet with the downlink SPI associated with the downlink ESP packet based at least in part on the record that includes the uplink SPI satisfying one or more conditions.

Some aspects described herein relate to a method of wireless communication performed by a UE. The method may include receiving a downlink ESP packet, wherein the downlink ESP packet is associated with a local IP address, a remote IP address, and a downlink SPI that is not mapped to an uplink SPI. The method may include providing, to the upper layer, a query that includes the local IP address, the remote IP address, and the downlink SPI. The method may include receiving, from the upper layer, a reply to the query, wherein the reply indicates an uplink SPI paired with the local IP address, the remote IP address, and the downlink SPI associated with the downlink ESP packet. The method may include mapping the downlink SPI associated with the downlink ESP packet with the uplink SPI indicated in the reply to the query.

Some aspects described herein relate to a method of wireless communication performed by a UE. The method may include determining, based at least in part on receiving a configuration message or deriving a new QoS flow to DRB mapping rule, that a DRB mapping rule associated with a QFI has changed. The method may include refraining from transmitting an end-marker SDAP control PDU on a current DRB associated with the QFI based at least in part on determining that the QFI is not associated with an uplink packet filter.

Some aspects described herein relate to a non-transitory computer-readable medium that stores a set of instructions for wireless communication by a UE. The set of instructions, when executed by one or more processors of the UE, may cause the UE to store a record including a first set of attributes associated with an uplink ESP packet sent by an upper layer of the UE, wherein the first set of attributes includes an uplink SPI included in a header of the uplink ESP packet and a flag indicating that the uplink SPI is not mapped to a downlink SPI. The set of instructions, when executed by one or more processors of the UE, may cause the UE to receive a downlink ESP packet associated with a second set of attributes, wherein the second set of attributes includes a downlink SPI included in a header of the downlink ESP packet. The set of instructions, when executed by one or more processors of the UE, may cause the UE to map the uplink SPI associated with the uplink ESP packet with the downlink SPI associated with the downlink ESP packet based at least in part on the record that includes the uplink SPI satisfying one or more conditions.

Some aspects described herein relate to a non-transitory computer-readable medium that stores a set of instructions for wireless communication. The set of instructions, when executed by one or more processors of a UE, may cause the UE to receive a downlink ESP packet, wherein the downlink ESP packet is associated with a local IP address, a remote IP address, and a downlink SPI that is not mapped to an uplink SPI. The set of instructions, when executed by the one or more processors of the UE, may cause the UE to provide, to the upper layer, a query that includes the local IP address, the remote IP address, and the downlink SPI. The set of instructions, when executed by the one or more processors of the UE, may cause the UE to receive, from the upper layer, a reply to the query, wherein the reply indicates an uplink SPI paired with the local IP address, the remote IP address, and the downlink SPI associated with the downlink ESP packet. The set of instructions, when executed by the one or more processors of the UE, may cause the UE to map the downlink SPI associated with the downlink ESP packet with the uplink SPI indicated in the reply to the query.

Some aspects described herein relate to a non-transitory computer-readable medium that stores a set of instructions for wireless communication. The set of instructions, when executed by one or more processors of a UE, may cause the UE to determine, based at least in part on receiving a configuration message or deriving a new QoS flow to DRB mapping rule, that a DRB mapping rule associated with a QFI has changed. The set of instructions, when executed by the one or more processors of the UE, may cause the UE to refrain from transmitting an end-marker SDAP control PDU on a current DRB associated with the QFI based at least in part on determining that the QFI is not associated with an uplink packet filter.

Some aspects described herein relate to an apparatus for wireless communication. The apparatus may include means for storing a record including a first set of attributes associated with an uplink ESP packet sent by an upper layer of the apparatus, wherein the first set of attributes includes an uplink SPI included in a header of the uplink ESP packet and a flag indicating that the uplink SPI is not mapped to a downlink SPI. The apparatus may include means for receiving a downlink ESP packet associated with a second set of attributes, wherein the second set of attributes includes a downlink SPI included in a header of the downlink ESP packet. The apparatus may include means for mapping the uplink SPI associated with the uplink ESP packet with the downlink SPI associated with the downlink ESP packet based at least in part on the record that includes the uplink SPI satisfying one or more conditions.

Some aspects described herein relate to an apparatus for wireless communication. The apparatus may include means for receiving a downlink ESP packet, wherein the downlink ESP packet is associated with a local IP address, a remote IP address, and a downlink SPI that is not mapped to an uplink SPI. The apparatus may include means for providing a query that includes the local IP address, the remote IP address, and the downlink SPI. The apparatus may include means for receiving a reply to the query, wherein the reply indicates an uplink SPI paired with the local IP address, the remote IP address, and the downlink SPI associated with the downlink ESP packet. The apparatus may include means for mapping the downlink SPI associated with the downlink ESP packet with the uplink SPI indicated in the reply to the query.

Some aspects described herein relate to an apparatus for wireless communication. The apparatus may include means for determining, based at least in part on receiving a configuration message or deriving a new QoS flow to DRB mapping rule, that a DRB mapping rule associated with a QFI has changed. The apparatus may include means for refraining from transmitting an end-marker SDAP control PDU on a current DRB associated with the QFI based at least in part on determining that the QFI is not associated with an uplink packet filter.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 7A-7B are diagrams illustrating an example of a UE applying NAS RQoS techniques to derive an uplink packet filter based on information in a downlink packet.

DETAILED DESCRIPTION

Figure 1:
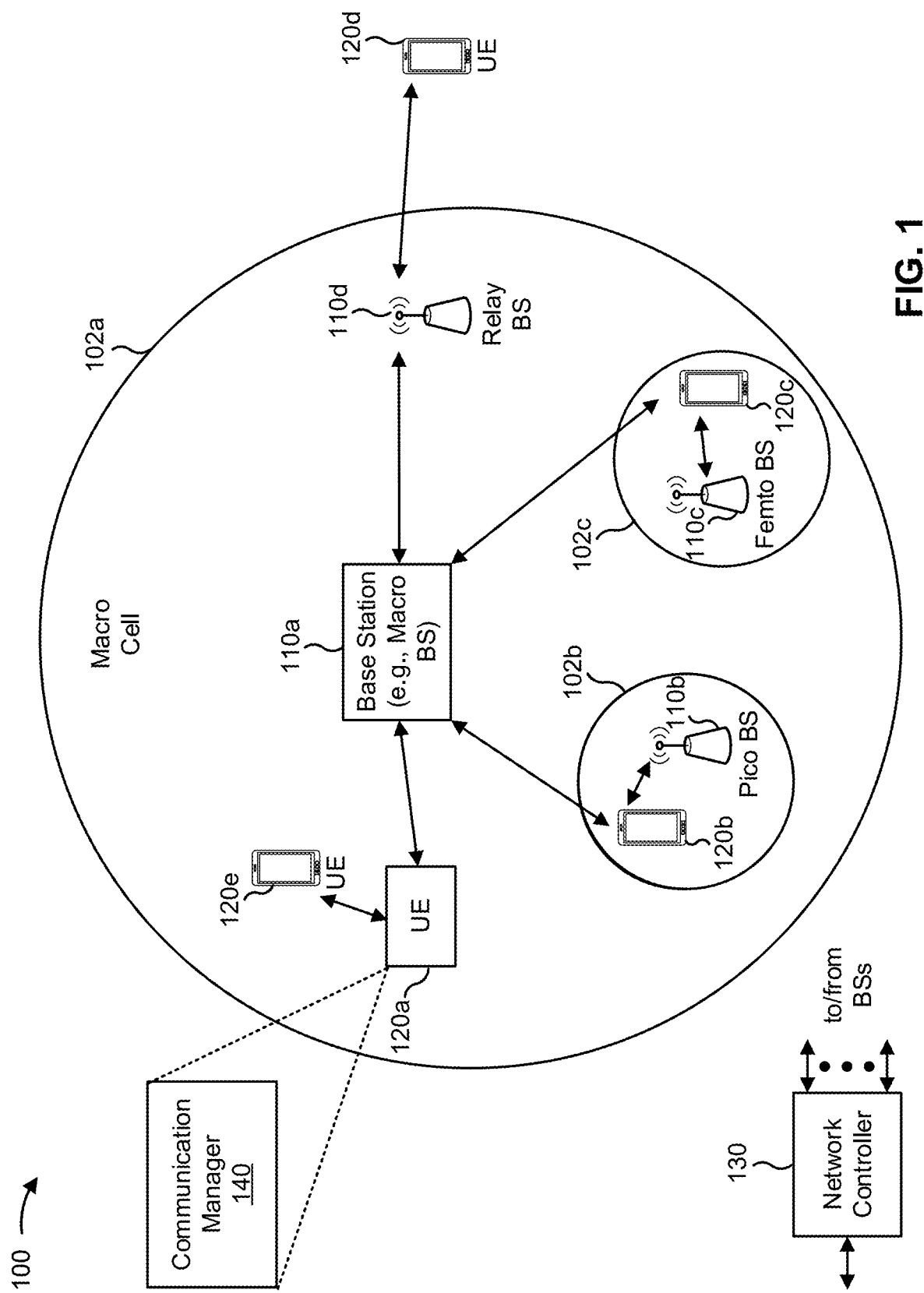
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may store a record including a first set of attributes associated with an uplink encapsulating security payload (ESP) packet sent by an upper layer of the UE 120, wherein the first set of attributes includes an uplink security parameters index (SPI) included in a header of the uplink ESP packet and a flag indicating that the uplink SPI is not mapped to a downlink SPI; receive a downlink ESP packet associated with a second set of attributes, wherein the second set of attributes includes a downlink SPI included in a header of the downlink ESP packet; and map the uplink SPI associated with the uplink ESP packet with the downlink SPI associated with the downlink ESP packet based at least in part on the record that includes the uplink SPI satisfying one or more conditions.

Additionally, or alternatively, in some aspects, and as described in more detail elsewhere herein, the communication manager 140 may receive a downlink ESP packet, wherein the downlink ESP packet is associated with a local Internet Protocol (IP) address, a remote IP address, and a downlink SPI that is not mapped to an uplink SPI; provide, to the upper layer, a query that includes the local IP address, the remote IP address, and the downlink SPI; receive, from the upper layer, a reply to the query, wherein the reply indicates an uplink SPI paired with the local IP address, the remote IP address, and the downlink SPI associated with the downlink ESP packet; and map the downlink SPI associated with the downlink ESP packet with the uplink SPI indicated in the reply to the query.

Additionally, or alternatively, in some aspects, and as described in more detail elsewhere herein, the communication manager 140 may determine, based at least in part on receiving a configuration message or deriving a new QoS flow to data radio bearer (DRB) mapping rule, that a DRB mapping rule associated with a QoS flow identifier (QFI) has changed; and refrain from transmitting an end-marker service data adaptation protocol (SDAP) control PDU on a current DRB associated with the QFI based at least in part on determining that the QFI is not associated with an uplink packet filter. Additionally, or alternatively, the communication manager 140 may perform one or more other operations described herein.

As indicated above, FIG. 1 is provided as an example. Other examples may differ from what is described with regard to FIG. 1.

Figure 2:
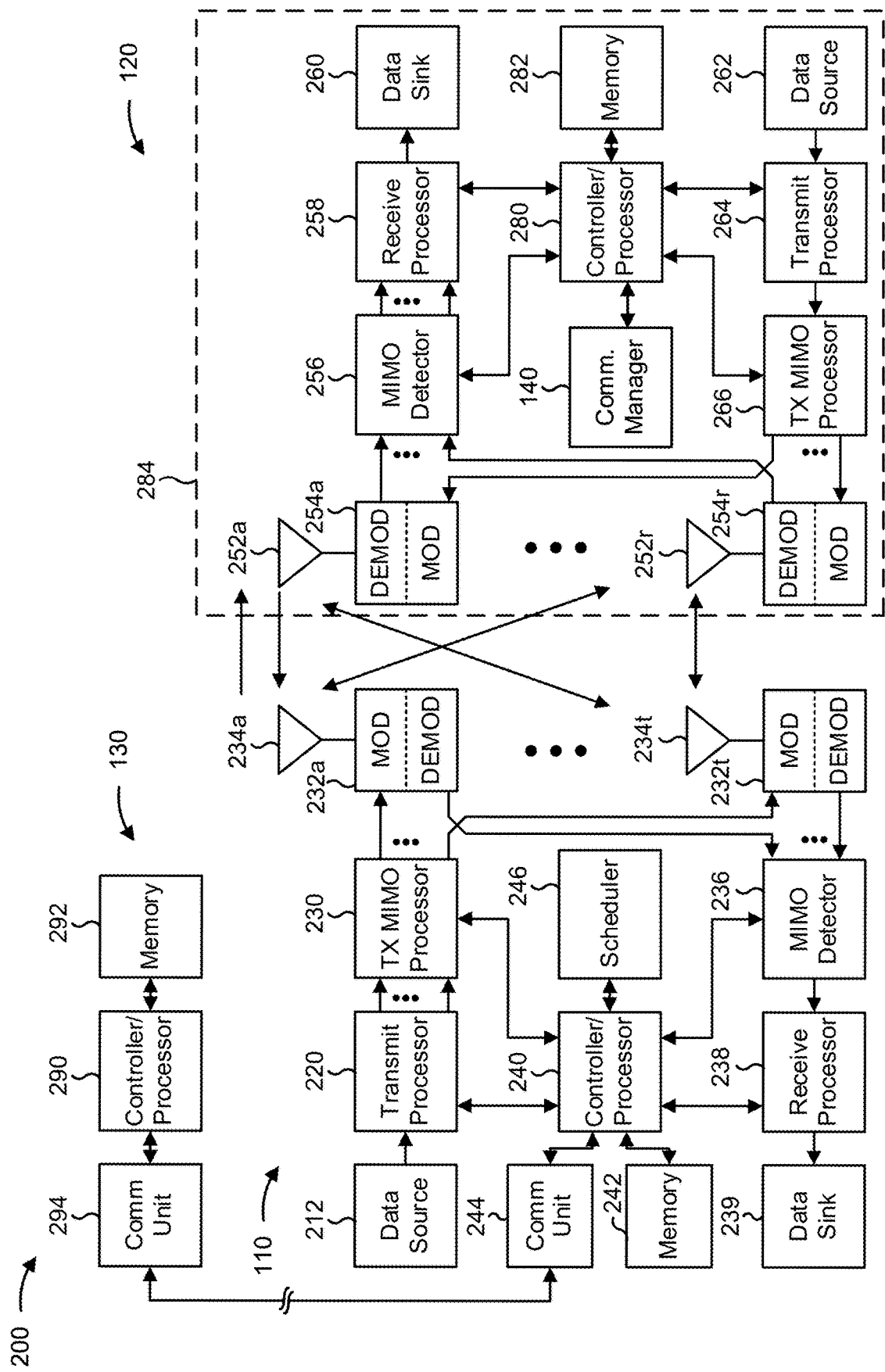
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with reflective quality of service (RQoS) for encapsulating security payload (ESP) packets, as described in more detail elsewhere herein. For example, the controller/processor 240 of the base station 110, the controller/processor 280 of the UE 120, and/or any other component(s) of FIG. 2 may perform or direct operations of, for example, method 1000 of FIG. 10, method 1100 of FIG. 11, method 1200 of FIG. 12, and/or other methods as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 1000 of FIG. 10, method 1100 of FIG. 11, method 1200 of FIG. 12, and/or other methods as described herein. In some examples, executing instructions may include running the instructions, converting the instructions, compiling the instructions, and/or interpreting the instructions, among other examples.

In some aspects, the UE 120 includes means for storing a record including a first set of attributes associated with an uplink ESP packet sent by an upper layer of the UE 120, wherein the first set of attributes includes an uplink security parameters index (SPI) included in a header of the uplink ESP packet and a flag indicating that the uplink SPI is not mapped to a downlink SPI; means for receiving a downlink ESP packet associated with a second set of attributes, wherein the second set of attributes includes a downlink SPI included in a header of the downlink ESP packet; and/or means for mapping the uplink SPI associated with the uplink ESP packet with the downlink SPI associated with the downlink ESP packet based at least in part on the record that includes the uplink SPI satisfying one or more conditions. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Additionally, or alternatively, in some aspects, the UE 120 includes means for receiving a downlink ESP packet, wherein the downlink ESP packet is associated with a local IP address, a remote IP address, and a downlink SPI that is not mapped to an uplink SPI; means for providing, to the upper layer, a query that includes the local IP address, the remote IP address, and the downlink SPI; means for receiving, from the upper layer, a reply to the query, wherein the reply indicates an uplink SPI paired with the local IP address, the remote IP address, and the downlink SPI associated with the downlink ESP packet; and/or means for mapping the downlink SPI associated with the downlink ESP packet with the uplink SPI indicated in the reply to the query. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Additionally, or alternatively, in some aspects, the UE 120 includes means for determining, based at least in part on receiving a configuration message or deriving a new QoS flow to DRB mapping rule, that a DRB mapping rule associated with a QFI has changed; and/or means for refraining from transmitting an end-marker SDAP control PDU on a current DRB associated with the QFI based at least in part on determining that the QFI is not associated with an uplink packet filter. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
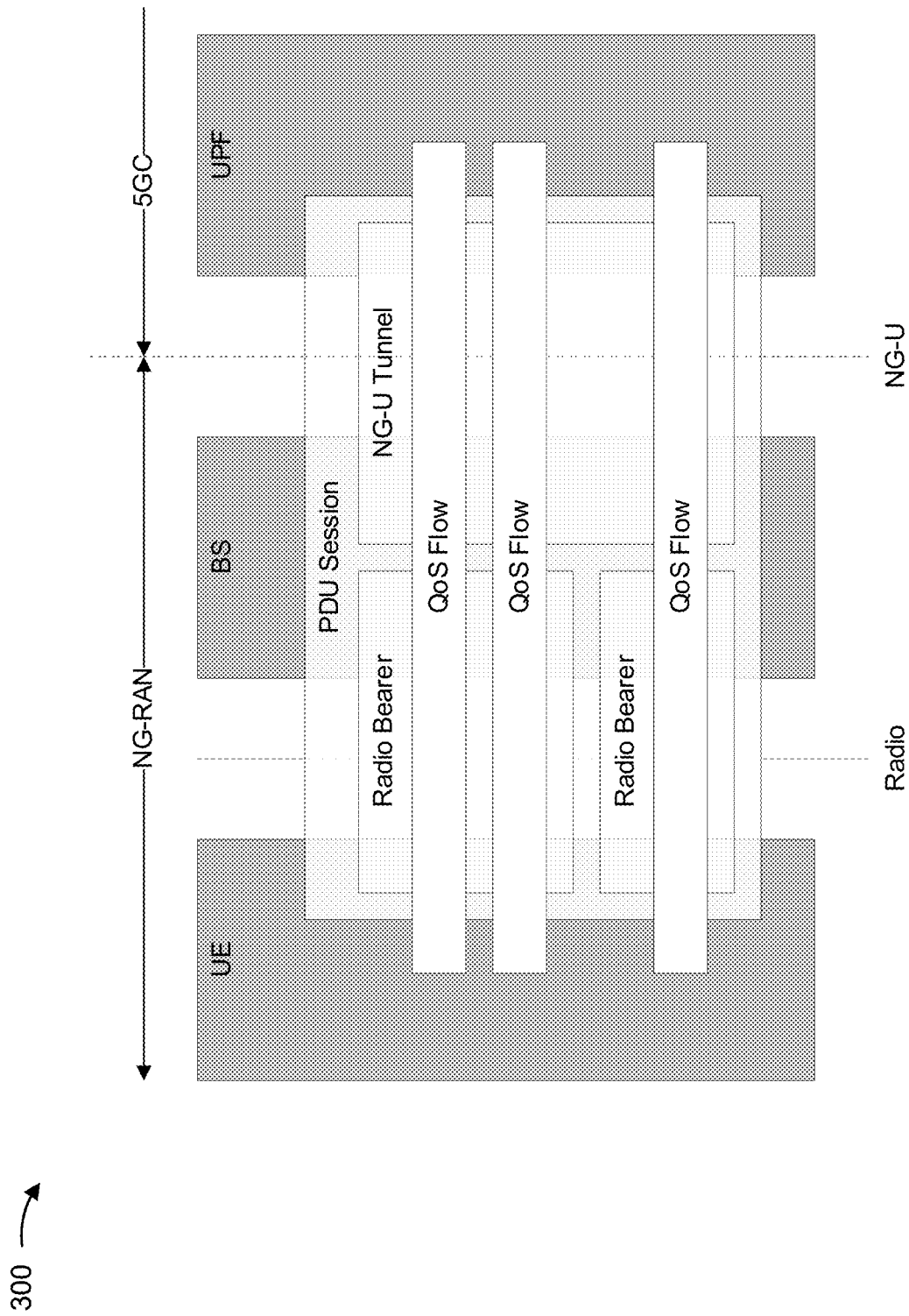
FIG. 3 is a diagram illustrating an example of a quality of service (QoS) architecture that may be used in a wireless network.

FIG. 3 is a diagram illustrating an example 300 of a quality of service (QoS) architecture that may be used in a wireless network (e.g., a 5G network). For example, as described herein, different communications may be associated with different QoS requirements, such as a latency requirement, a delay requirement, a jitter requirement, a block error rate (BLER) requirement, and/or a packet error rate requirement, among other examples. For example, a voice communication may have stricter QoS requirements than a data communication, or an ultra-reliable low-latency communication (URLLC) service may have stricter QoS requirements than an enhanced mobile broadband (eMBB) service.

As shown in FIG. 3, the QoS architecture used in a wireless network may be based on QoS flows and may support both QoS flows that require a guaranteed bit rate (GBR QoS flows) and QoS flows that do not require a GBR (non-GBR QoS flows). Accordingly, at a non-access stratum (NAS) level, the QoS flow is the finest granularity of QoS differentiation in a protocol data unit (PDU) session. As shown in FIG. 3, a user plane function (UPF) may identify a QoS flow within a PDU session using a QoS flow identifier (QFI) that may be carried in an encapsulation header transmitted from the UPF to a base station over an NG-U interface. For example, as shown in FIG. 3, the QoS architecture may include a next-generation radio access network (NG-RAN) connected to a 5G core network (5GC), where the 5GC may establish one or more PDU sessions for each UE communicating with a base station in the NG-RAN. Furthermore, the NG-RAN may establish one or more data radio bearers (DRBs) per PDU session for each UE, and the NG-RAN may map packets that belong to different PDU sessions to different DRBs. Accordingly, the NG-RAN may establish at least one default DRB for each PDU session. Non-access stratum (NAS)-level packet filters may be used in the UE and in the 5GC to associate uplink packets and downlink packets with QoS flows, and access stratum (AS)-level packet filters may be used in the UE and in the NG-RAN to associate uplink QoS flows and downlink QoS flows with DRBs.

In the QoS architecture shown in FIG. 3, the NG-RAN and the 5GC may ensure QoS (e.g., reliability and target delay) by mapping packets to appropriate QoS flows and DRBs. Accordingly, there is typically a two-step mapping of Internet Protocol (IP) flows to QoS flows at the NAS level and from QoS flows to DRBs at the AS level.

For example, at the NAS level, a QoS flow may be associated with a QoS profile provided from the 5GC to the NG-RAN (e.g., from the UPF to a base station) and one or more QoS rules provided from the 5GC to a UE. The QoS profile may be used by the NG-RAN to determine the treatment to be applied to a packet on a radio interface between the base station and the UE, while the QoS rule(s) dictate the mapping between uplink user plane traffic and QoS flows to the UE. In general, a QoS flow may either be a GBR QoS flow or a non-GBR QoS flow depending on the QoS profile associated with the QoS flow. The QoS profile associated with a QoS flow may include various QoS parameters, which may include a 5G QoS identifier (5QI) and an allocation and retention priority (ARP). Furthermore, the QoS profile associated with a GBR QoS flow may include a guaranteed flow bit rate (GFBR) for both uplink and downlink, a maximum flow bit rate (MFBR) for both uplink and downlink, and a maximum packet loss rate for both uplink and downlink. Alternatively, the QoS profile associated with a non-GBR QoS flow may include a reflective QoS attribute (RQA), which may indicate that at least some (but not necessarily all) traffic carried on the QoS flow is subject to reflective QoS (RQoS) at the NAS level when the RQA parameter is included in the QoS profile.

In addition, an aggregate maximum bit rate may be associated with each PDU session (Session-AMBR) and with each UE (UE-AMBR). The Session-AMBR may generally limit the aggregate bit rate that can be expected to be provided across all non-GBR QoS flows for a specific PDU session, and the UE-AMBR may limit the aggregate bit rate that can be expected to be provided across all non-GBR QoS flows for a UE. The 5QI may be associated with QoS characteristics that indicate guidelines to set node-specific parameters for each QoS flow, where standardized or pre-configured 5G QoS characteristics may be derived from the 5QI value and are not explicitly signaled. QoS characteristics that are signaled may be included in the QoS profile. For example, the QoS characteristics associated with the 5QI may include a resource type (e.g., GBR, delay critical GBR, or non-GBR), a priority level, a packet delay budget, a packet error rate, an averaging window, and/or a maximum data burst volume, among other examples.

At the AS-level, the DRB defines the packet treatment on the radio interface (Uu). For example, a DRB may serve packets with the same packet forwarding treatment. The mapping between a QoS flow and a DRB at the NG-RAN may be based on a QFI and one or more associated QoS profiles (e.g., QoS parameters and/or QoS characteristics). Separate DRBs may be established for QoS flows that require different packet forwarding treatment, or several QoS flows that belong to the same PDU session can be multiplexed in the same DRB. On the uplink, the NG-RAN may control the mapping between QoS flows and DRBs using a reflective mapping or an explicit configuration. For example, in a reflective mapping, the UE may monitor the QFI(s) associated with the downlink packets for each DRB, and may apply the same mapping on the uplink. In other words, for a DRB, the UE may map the uplink packets that belong to one or more QoS flows corresponding to the QFI(s) and PDU session observed in the downlink packets for that DRB. To enable the reflective mapping, the NG-RAN may mark downlink packets that are transmitted to the UE on the Uu interface with a QFI. Alternatively, for an explicit configuration, the NG-RAN may configure an uplink QoS flow to DRB mapping using radio resource control (RRC) signaling. The UE may generally apply the latest update of the mapping rules regardless of whether the mapping is based on a reflective mapping or an explicit configuration.

On the downlink, the QFI may be signaled by the NG-RAN over the Uu interface to enable RQoS on the uplink. Alternatively, if neither the NG-RAN nor the NAS (e.g., as indicated by the RQA) intend to use a reflective mapping for one or more QoS flows carried in a DRB, no QFI is signaled for that DRB over the Uu interface. On the uplink, the NG-RAN can configure the UE to signal a QFI over the Uu interface.

In the QoS architecture shown in FIG. 3, a default DRB may be configured for each PDU session. In cases where an incoming uplink packet to be transmitted by a UE does not match an RRC-configured mapping between a QFI and a DRB and/or a reflective mapping between a QFI and a DRB, the UE may map the packet to the default DRB.

Within each PDU session, the NG-RAN may determine how to map multiple QoS flows to a DRB. The NG-RAN may map a GBR flow and a non-GBR flow, or more than one GBR flow to the same DRB. The time when one or more non-default DRBs between the NG-RAN and the UE for a QoS flow configured are established during a PDU session establishment can be different from the time when the PDU session is established, where the NG-RAN may determine when non-default DRBs are established.

As indicated above, FIG. 3 is provided as an example. Other examples may differ from what is described with regard to FIG. 3.

Figure 4A:
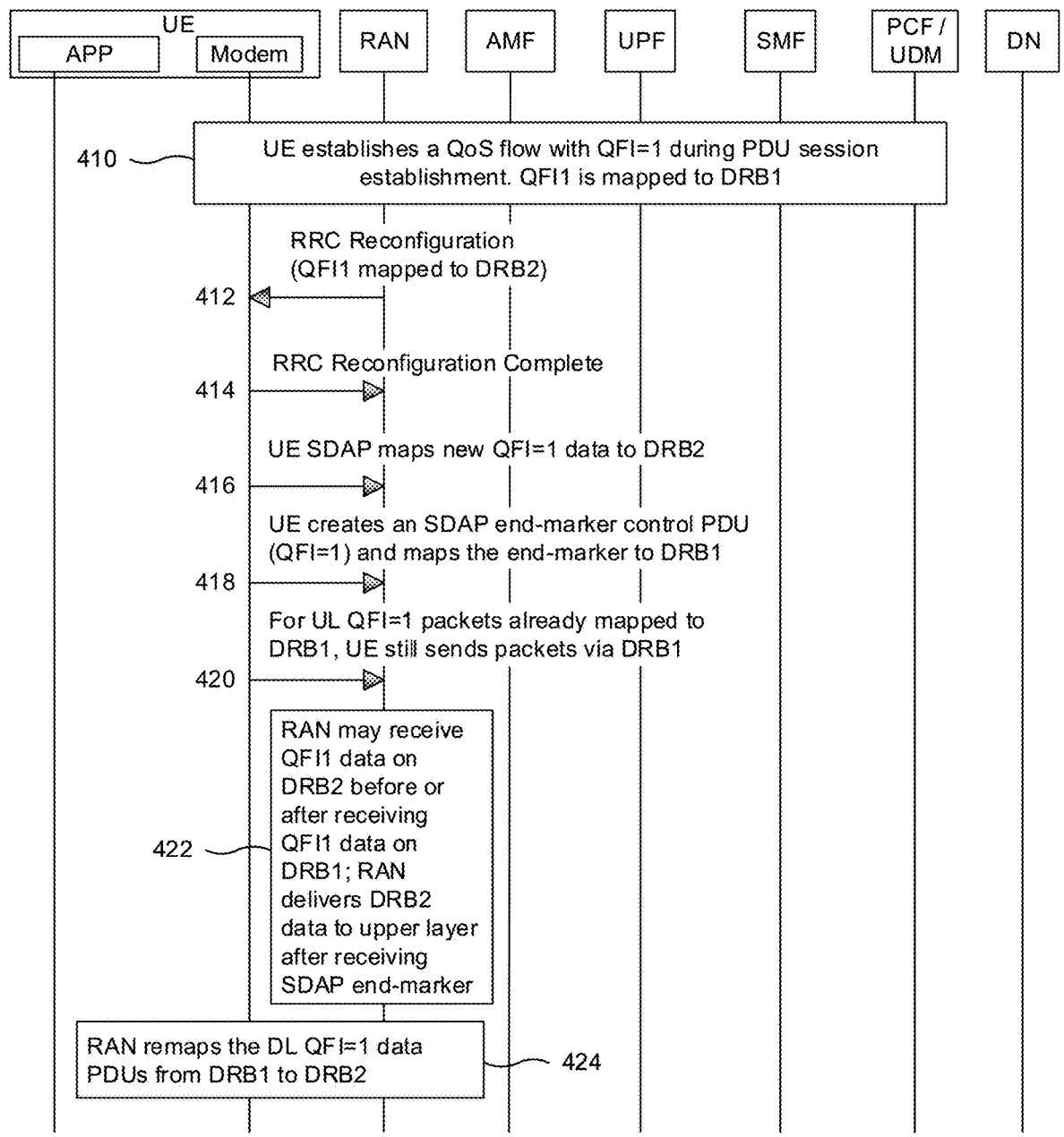
FIGS. 4A-4B are diagrams illustrating an example associated with remapping a QoS flow based on a service data adaptation protocol (SDAP) end-marker.
Figure 4B:
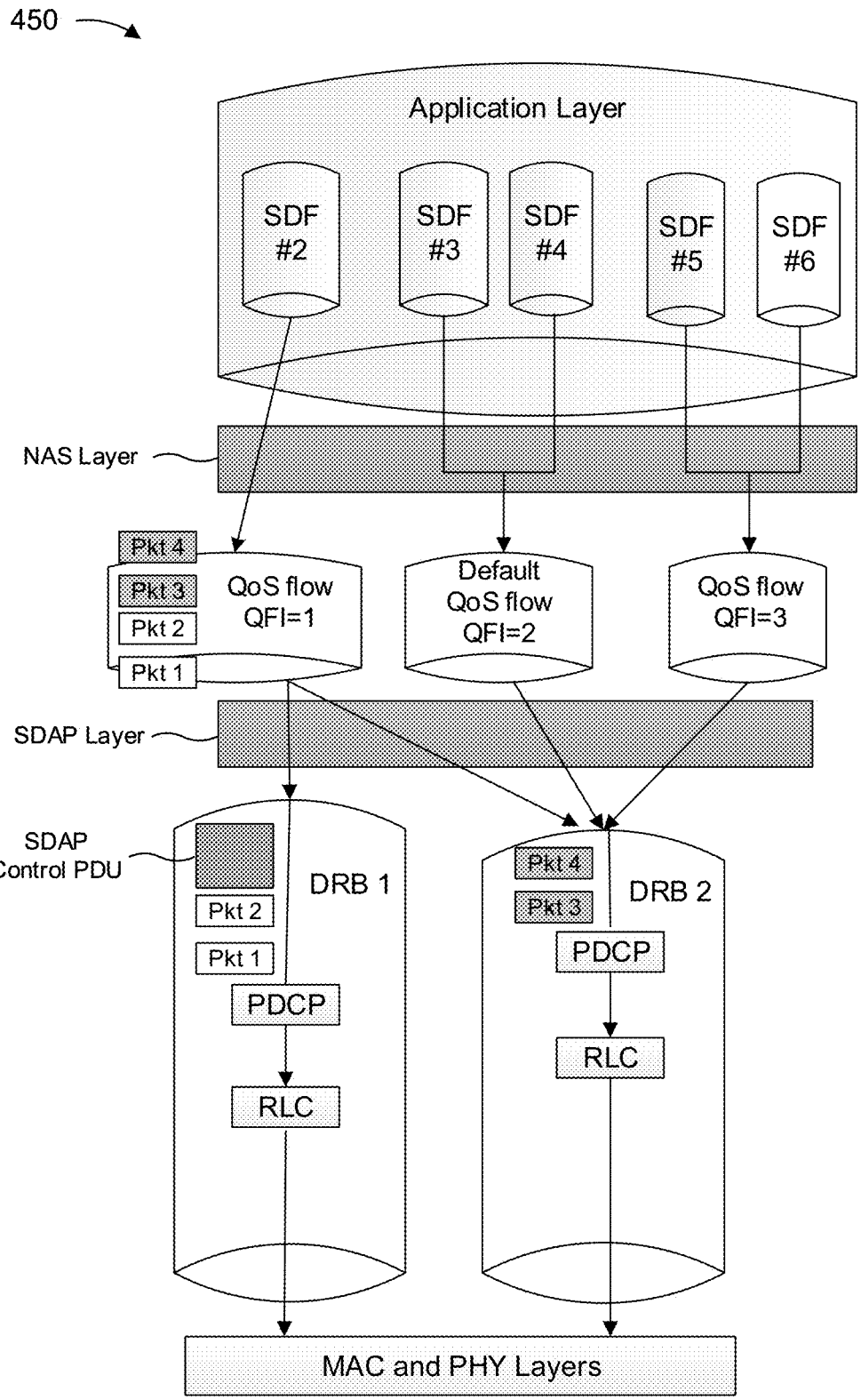

FIGS. 4A-4B are diagrams illustrating an example 400 associated with remapping a QoS flow based on a service data adaptation protocol (SDAP) end-marker. As shown in FIG. 4A, example 400 includes communication between a UE that includes an application layer (e.g., an upper layer) and a modem, a RAN that may include one or more base stations, one or more core network devices (e.g., an access and mobility management function (AMF), a UPF, a session management function (SMF), and/or a policy control function (PCF) and/or unified data management function (UDM), among other examples), and a data network. As described herein, FIG. 4A illustrates a call flow in which the RAN may configure the UE to change an AS-level mapping for an existing QoS flow from a first DRB to a second DRB via RRC signaling. Furthermore, as described herein, the UE may use an end-marker SDAP control protocol data unit (PDU) to apply the configuration change without releasing the first DRB. As described in further detail herein, FIG. 4B illustrates an example PDU session 450 in which the UE may use the end-marker SDP control PDU to apply the configuration change.

In some aspects, the call flow shown in FIG. 4A may start from a state in which the UE is registered with the core network and the UE is camped on a cell in the RAN. For example, the UE may be in an RRC connected mode, and have established a PDU session associated with a PDU session type (e.g., IPv4, IPv6, IPv4v6, or Ethernet). For example, in FIG. 4B, the example PDU session 450 may be an IP or Ethernet PDU session associated with one or more service data flows (SDFs), where an SDF may include data, packets, and/or frames from one set of applications on the UE. In general, the UE may have one or more PDU sessions, each PDU session can have one or more DRBs, and each DRB can have one or more QoS flows, where each QoS flow is identified by a QFI that may contain one or more SDFs.

As shown in FIG. 4A, at 410, the UE may establish a QoS flow with a particular QFI (e.g., QFI=1) during PDU establishment, and RRC signaling may configure a mapping between the QFI and a DRB (e.g., mapping QFI1 to DRB1). In the example described herein, the UE may transfer uplink application data and downlink application data via QFI1 and DRB1.

As further shown in FIG. 4A, at 412, the RAN may send, to the UE, an RRC reconfiguration message that contains the mapping between the QFI and the DRB (e.g., in an sdap-Config information element (IE) included in a DRB-ToAddMod of a RadioBearerConfig parameter). In this example, the existing QFI1 is mapped to DRB2. Accordingly, the RRC reconfiguration message may act as a trigger to instruct the UE to change the mapping for the existing QFI1 from DRB1 to DRB2.

As further shown in FIG. 4A, at 414, the UE may send an RRC reconfiguration complete message to the RAN to acknowledge the RRC reconfiguration message.

As further shown in FIG. 4A, at 416, the UE may map, at an SDAP layer, all new uplink data associated with QFI1 to DRB2. For example, in FIG. 4B, a first uplink packet and a second uplink packet (shown as Pkt 1 and Pkt 2) are transmitted before the UE receives the RRC reconfiguration message changing the mapping for QFI1 from DRB1 to DRB2, whereby the first uplink packet and the second uplink packet are mapped to DRB1. Furthermore, a third uplink packet and a fourth uplink packet (shown as shaded packets Pkt 3 and Pkt 4) are transmitted after the UE receives the RRC reconfiguration message changing the mapping for QFI1 to DRB2, whereby the third uplink packet and the fourth uplink packet are mapped to DRB2.

As further shown in FIG. 4A, at 418, the UE may create an SDAP control PDU for QFI1 and place the SDAP control PDU into a Layer-2 (L2) transmission buffer associated with DRB1 after the UE has confirmed that no new QFI1 uplink data is mapped to DRB1. In general, the SDAP control PDU is the last packet data convergence protocol (PDCP) PDU in DRB1. For example, as shown in FIG. 4B, the UE may place the SDAP control PDU in the L2 transmission buffer associated with DRB1 after the second uplink packet. In general, the PDCP entity may be unable to differentiate the SDAP control PDU from an SDAP data PDU, whereby the SDAP data PDU(s) and the SDAP control PDU are treated in the same way by PDCP and a PDCP layer preserves an order of the SDAP data PDU(s) and the SDAP control PDU (e.g., the PDCP layer ensures that the SDAP control PDU is the last PDCP PDU for QFI1 in DRB1). Accordingly, the SDAP control PDU serves as an end-marker in the QFI re-mapping.

As further shown in FIG. 4A, at 420, the UE may have already mapped some QFI1 uplink data to DRB1 and placed the QFI uplink data into the L2 transmission buffer associated with DRB1. Accordingly, at 420, the UE may transmit, via DRB1, all QFI1 uplink data that is already in the L2 transmission buffer associated with DRB1. For example, in FIG. 4B, the first uplink packet and the second uplink packet associated with QFI1 are already mapped to DRB1 at the time that the SDAP control PDU is placed into the L2 transmission buffer associated with DRB1, whereby the UE may transmit the first uplink packet and the second uplink packet via DRB1.

As further shown in FIG. 4A, at 422, the RAN may receive the uplink data mapped to DRB2 at 416 before or after receiving the uplink data mapped to DRB1 at 420 (e.g., due to hybrid automatic repeat request (HARQ) and/or logical channel prioritization (LCP) where DRB2 may have a higher priority than DRB1 in medium access control (MAC) layer scheduling). However, in cases where the RAN receives the uplink data mapped to DRB2 before receiving the uplink data mapped to DRB1, the RAN generally delivers DRB2 data to the upper layer only after receiving the end-marker SDAP control PDU. Accordingly, the RAN may deliver DRB1 data to the upper layer before delivering DRB2 data for QFI1 in the uplink. For example, in FIG. 4B, the RAN may receive the third and/or fourth uplink packet (from DRB2) earlier than the first and/or second uplink packet (from DRB1) or the SDAP control PDU. However, the RAN will deliver the third uplink packet to the upper layer only after the SDAP control PDU is received.

As further shown in FIG. 4A, at 424, the RAN may remap the downlink QFI1 data from DRB1 to DRB2. In general, the remapping may be performed by the RAN at any time during the call flow shown in FIG. 4A. Accordingly, as described herein, the application layer of the UE may transfer downlink and uplink data using the new QFI-to-DRB mapping rules as configured by the RAN without discarding uplink data, and the end-marker SDAP control PDU ensures that uplink data is not out-of-order at the receiver side (e.g., the RAN). For example, as described herein, the UE may generally send the end-marker SDAP control PDU whenever there is a change to a mapping between a QoS flow and a DRB to enable uplink packet reordering when the mapping between a QoS flow and a DRB changes. However, in cases where a QoS flow is downlink-only (e.g., there is no uplink data), then there is no need to send the end-marker SDAP control PDU, which wastes resources and increases uplink control overhead. Accordingly, in some aspects described herein, the UE may avoid sending the end-marker SDAP control PDU in cases where the RRC reconfiguration message indicates a change to a DRB mapped to a QoS flow that is not associated with any uplink packet filters. For example, when the UE receives an RRC reconfiguration message that instructs the UE to change the DRB mapped to a QFI from a first DRB to a second DRB, the UE does not need to send the end-marker SDAP control PDU (e.g., the control signal from the UE to guarantee in-order delivery of uplink data during remapping) in cases where the QFI is associated with zero (0) uplink packet filters. For example, the end-marker SDAP control PDU may be unnecessary in such cases because the sole purpose of the end-marker SDAP control PDU is to guarantee in-order delivery of uplink data during remapping, which is not needed for a downlink-only QoS flow that is not associated with any uplink packet filters, thereby reducing uplink overhead associated with the end-marker SDAP control PDU.

As indicated above, FIGS. 4A-4B are provided as an example. Other examples may differ from what is described with regard to FIGS. 4A-4B.

Figure 5A:
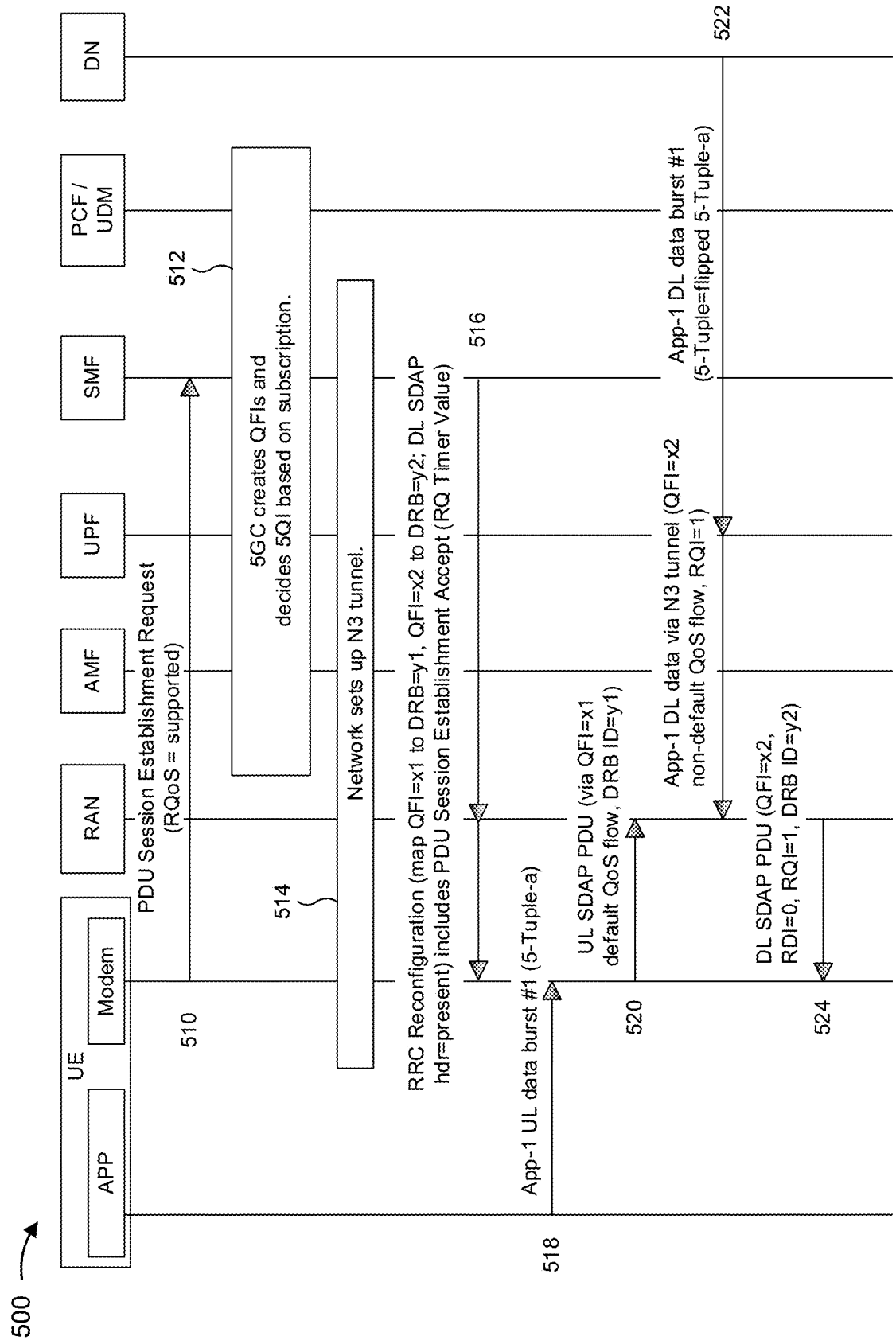
FIGS. 5A-5B are diagrams illustrating an example of non-access stratum (NAS) reflective QoS (RQoS).
Figure 5B:
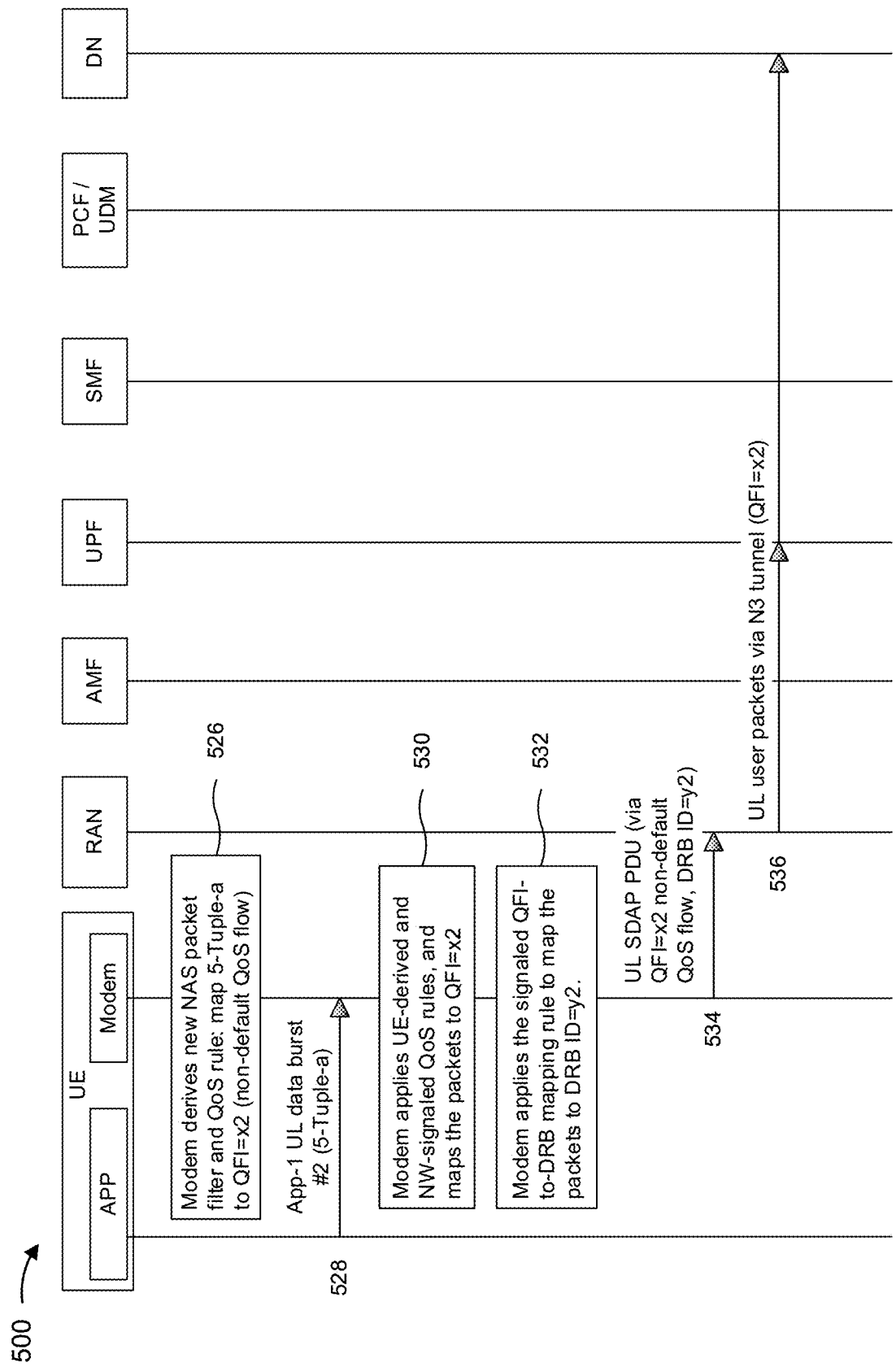

FIGS. 5A-5B are diagrams illustrating an example 500 of NAS RQoS. As shown in FIGS. 5A-5B, example 500 includes communication between a UE that includes an application layer (e.g., an upper layer) and a modem, a RAN that may include one or more base stations, one or more core network devices (e.g., an AMF, a UPF, an SMF, and/or a PCF/UDM, among other examples), and a data network. As described herein, FIGS. 5A-5B illustrate a call flow in which the UE may request to establish a new PDU session, and the RAN may decide to use NAS RQoS without AS RQoS for the new PDU session. In some aspects, the call flow shown in FIGS. 5A-5B may start from a state in which the UE is registered with the core network and has established zero or more PDU sessions, and the UE has a subscription that allows IP or Ethernet PDU types.

As shown in FIG. 5A, at 510, the UE may send a PDU session establishment request message to the SMF. In general, the PDU session establishment request message may include an RQoS bit indicating that the UE supports RQoS (e.g., in a UE capability IE)). The UE may set a PDU session type in the PDU session establishment request message to "IPv4v6", "IPv4", "IPv6", or "Ethernet". In the example 500 shown in FIGS. 5A-5B and described herein, the first application packet may be an uplink packet (not downlink), whereby the application triggers the UE to establish the new PDU session.

As further shown in FIG. 5A, at 512, the core network devices may create one or more QFIs and determine a 5QI parameter based on the subscription of the UE. For downlink traffic, the SMF may send an RQoS indication (RQI) to the UPF to activate RQoS per SDF for a given QFI. The SMF (via the AMF) may then send, to the RAN, one or more QoS profiles that contain the optional RQA parameter described above in connection with FIG. 3. Each QoS profile sent from the SMF to the RAN may correspond to a QFI, and the presence of the RQA parameter indicates that certain traffic (not necessarily all) carried on the associated QFI is subject to RQoS. The QoS Profile may provide the RAN with a mapping between QoS parameters and the QFI.

As further shown in FIG. 5A, at 514, the RAN and the core network may set up an N3 tunnel for the PDU session.

As further shown in FIG. 5A, at 516, the RAN may configure the UE with one or more new DRBs, QFI-to-DRB mapping rules, and a downlink SDAP header via RRC signaling. In the absence of AS RQoS, the RAN may configure the downlink SDAP header for a DRB based on the RQA received at 512 (e.g., the RAN configures the downlink SDAP header when the RQA is present in the QoS profile of at least one QoS flow within the DRB). In the example described herein, QFI=x1 may be mapped to DRB=y1, and QFI=x2 may be mapped to DRB=y2. At 516, the UE may receive a PDU session establishment accept message from the SMF with an RQ timer value in an RQ timer IE. In cases where the RQ timer value is neither deactivated nor zero, the RQoS timer value may indicate that the SMF is enabling the UE with NAS RQoS for the PDU session. The PDU session establishment accept message may contain a default QoS rule (e.g., {match-all filter, QFI=x1, precedence value=255}).

As shown in FIG. 5A, at 518, the application layer of the UE may send a first uplink data burst with a transmission control protocol (TCP)/IP 5-tuple, which includes a source IP address, a destination IP address, a source port, a destination port, and a protocol. The UE may match the uplink data packets against one or more uplink packet filters in existing QoS rules. At this point in the call flow, the UE has only network-signaled QoS rules and no UE-derived QoS rule. In this example, the 5-tuple associated with the uplink data packets matches the uplink packet filter associated with the default QoS rule QFI=x1, which was configured at 516 to be mapped to DRB=y1. Accordingly, as shown at 520, the first data burst may be sent via QFI=x1 (e.g., the default QoS flow) and DRB=y1 mapped to QFI=x1.

As shown in FIG. 5A, at 522, the data network may send a first downlink data burst to the application layer of the UE in reply to the first uplink data burst from the application layer of the UE. In this example, the downlink packets include a TCP/IP 5-tuple that is the source-destination swapped version of the 5-tuple from the UE (e.g., the downlink packet has a source IP address and a source port that are the same as the destination IP address and the destination port of the uplink packet, respectively). As further shown, the UPF matches the downlink packets against the downlink packet filters from one or more packet detection rules (PDR). In this example, the 5-tuple associated with the downlink packet matches a downlink PDR that has NAS RQoS activated and associated with QFI=x2. The UPF may set QFI=x2 and RQI=1 in an encapsulation header on an N3 reference point for every downlink packet corresponding to the SDF. As shown at 524, when the RAN receives a downlink packet with an RQI=1 on the N3 reference point, the RAN may indicate the QFI and the RQI of the downlink packet to the UE in an SDAP header, and the RAN may map the packets with QFI=x2 to DRB=y2.

As shown in FIG. 5B, at 526, the modem of the UE may derive a new QoS rule containing QFI=x and a new NAS packet filter mapping the 5-tuple associated with the first uplink data burst to QFI=x2 associated with the first downlink data burst, based on the downlink SDAP PDU. The derived QoS rule may have a fixed precedence value (e.g., 80) and may map the 5-tuple associated with the first uplink data to the QoS flow with QFI=x2 (e.g., a non-default QoS flow).

As shown in FIG. 5B, at 528, the application layer of the UE may send a second uplink data burst with the same TCP/IP 5-tuple as the first uplink data burst.

As shown in FIG. 5B, at 530, the modem of the UE may apply both UE-derived QoS rules and network-configured QoS rules, and may associate the uplink packet(s) in the second uplink data burst with QFI=x2. Although both a network-signaled default QoS rule (e.g., precedence value 255) and a UE-derived QoS rule (e.g., precedence value 80) match the uplink packet(s), the modem of the UE may associate the uplink packet(s) with the UE-derived QoS rule based on the lower precedence value.

As shown in FIG. 5B, at 532, the modem of the UE may apply the QFI-to-DRB mapping rule that was signaled at 516 to map the packets to DRB=y2.

As shown in FIG. 5B, at 534, the modem of the UE may place the uplink packet(s) associated with the second uplink data burst in an uplink SDAP PDU, and may send the uplink SDAP PDU via QFI=x2 and DRB=y2.

As shown in FIG. 5B, at 536, the RAN may forward the uplink packet(s) associated with the second uplink data burst to the UPF via the N3 tunnel with QFI=x2 in the tunnel header, and the UPF may forward the uplink packet(s) to the data network.

As indicated above, FIGS. 5A-5B are provided as an example. Other examples may differ from what is described with regard to FIGS. 5A-5B.

Figure 6:
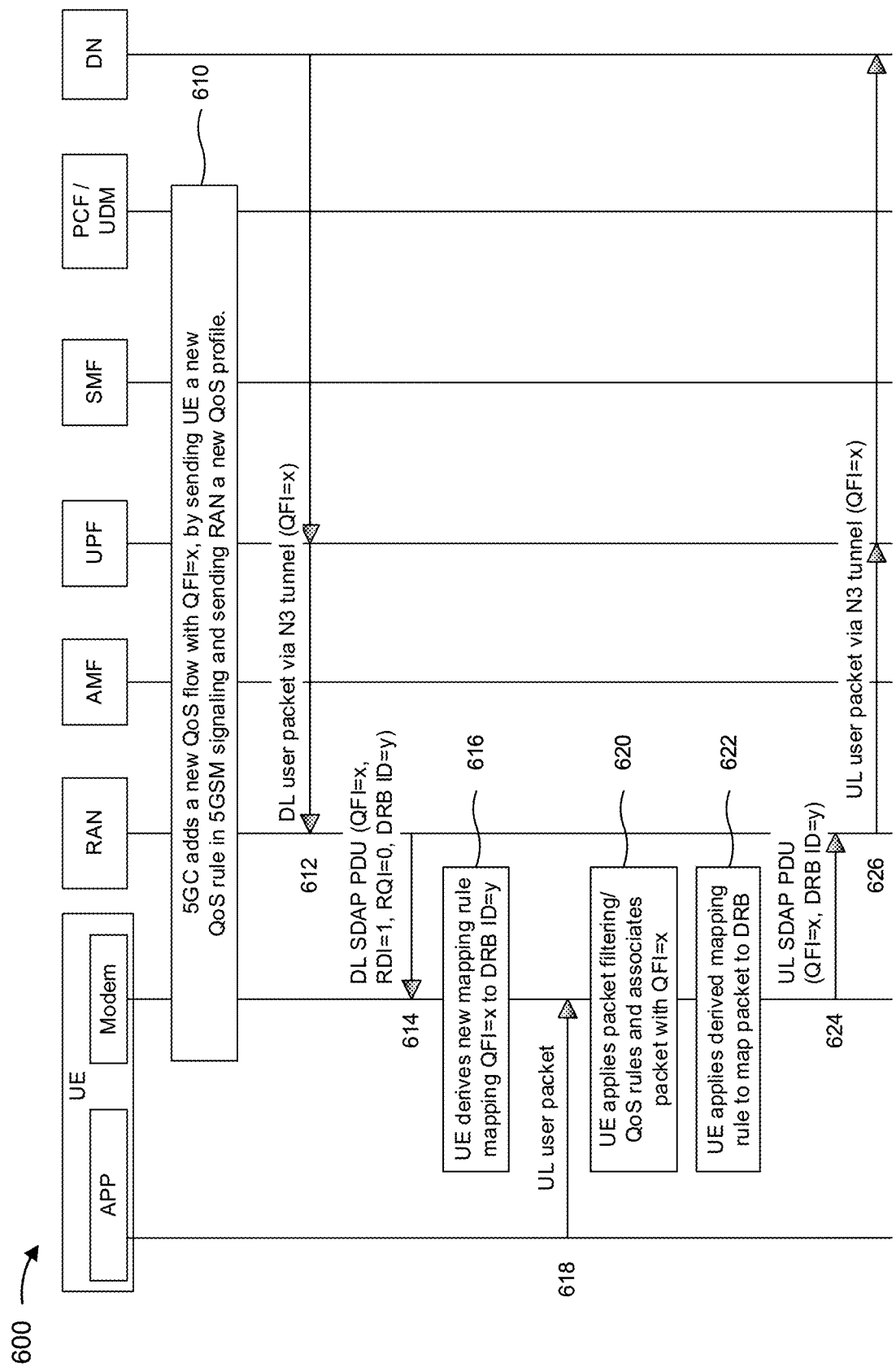
FIG. 6 is a diagram illustrating an example of access stratum (AS) RQoS.

FIG. 6 is a diagram illustrating an example 600 of AS RQoS. As shown in FIG. 6, example 600 includes communication between a UE that includes an application layer (e.g., an upper layer) and a modem, a RAN that may include one or more base stations, one or more core network devices (e.g., an AMF, a UPF, an SMF, and/or a PCF/UDM, among other examples), and a data network. As described herein, FIG. 6 illustrates a call flow in which the UE performs an AS RQoS operation to derive a mapping between a QoS flow and a DRB. Explicit NAS QoS signaling (as opposed to NAS RQoS) is used to configure the UE with uplink packet filters. In some aspects, the call flow shown in FIG. 6 may start from a state in which the UE has indicated to the RAN that the UE supports AS RQoS (e.g., via an as-ReflectiveQoS parameter) in RRC signaling indicating capabilities of the UE. The UE may be in an RRC connected mode, and the UE has established at least on PDU session and any associated DRB(s). As described herein, the core network may add a new QoS flow associated with a QFI by sending, to the UE, signaling indicating a new QoS rule and sending, to the RAN, a new QoS profile.

As shown in FIG. 6, at 610, the core network may initiate the call flow to add a new QoS flow associated with a QFI (e.g., QFI=x) by sending a PDU session modification command message to the UE with new QoS rules and by sending one or more new QoS profiles to the RAN. The RAN may decide to use AS RQoS to map the new QFI=x to an existing DRB (e.g., DRB=y).

As further shown in FIG. 6, at 612, the data network may send a downlink user packet to the UE. The downlink user packet may be received at the UPF, and the UPF may forward the packet to the RAN via an N3 tunnel with QFI=x in the tunnel header.

As further shown in FIG. 6, at 614, the RAN may send the downlink user packet to the UE in an SDAP PDU that includes an SDAP header. For example, the SDAP header may contain one or more fields indicating QFI=x, a reflective QoS flow to DRB mapping indication (RDI)=1, and RQI=0.

As further shown in FIG. 6, at 616, the modem of the UE may derive a new mapping rule based on the downlink SDAP PDU (e.g., mapping QFI=x to DRB=y).

As further shown in FIG. 6, at 618, an application layer of the UE may send an uplink user packet, which is received at the modem.

As further shown in FIG. 6, at 620, the modem of the UE may apply uplink packet filtering and associate the uplink user packet with QFI=x.

As further shown in FIG. 6, at 622, the modem of the UE may apply the mapping rule derived at 616 to map the uplink user packet to the appropriate DRB (DRB=y).

As further shown in FIG. 6, at 624, the modem of the UE may place the uplink user packet in an uplink SDAP PDU and may send the uplink SDAP PDU via QFI=x and the associated DRB=y.

As further shown in FIG. 6, at 626, the RAN may forward the uplink user packet to the UPF via the N3 tunnel with QFI=x in the tunnel header, and the UPF may forward the uplink user packet to the data network.

As indicated above, FIG. 6 is provided as an example. Other examples may differ from what is described with regard to FIG. 6.

Figure 7A:
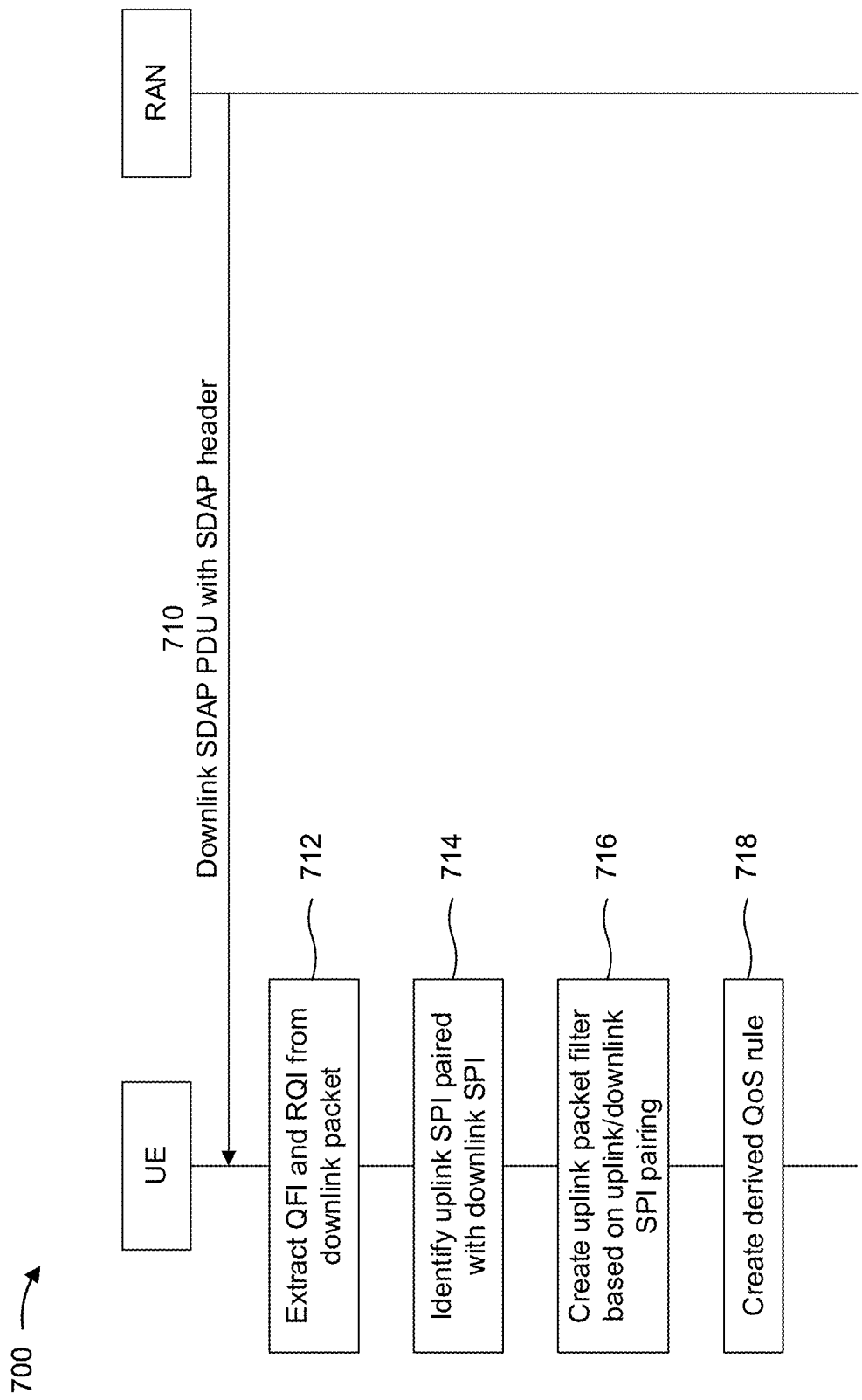

FIGS. 7A-7B are diagrams illustrating an example 700 of a UE applying NAS RQoS techniques to derive an uplink packet filter based on information in a downlink packet. As shown in FIG. 7A, example 700 includes communication between a UE and a RAN to enable NAS RQoS for one or more downlink packets in a similar manner as described above in connection with FIGS. 5A-5B. For example, when the UE receives a downlink SDAP PDU in a DRB with an SDAP header parameter that includes an RQI=1, the UE may extract a QFI value from the SDAP header and derive an uplink packet filter based on the received downlink SDAP data PDU. For example, the UE may derive the uplink packet filter by applying the NAS RQoS described above in connection with FIGS. 5A-5B, which may include extracting a 5-tuple (e.g., a source IP address, destination IP address, source port, destination port, and protocol) from TCP, User Datagram Protocol (UDP), and/or IP headers. The UE may then search for the derived packet filter in a stored derived QoS rule table (e.g., indicating a UE-derived uplink packet filter, QFI value, precedence value, and remaining validity time for one or more existing UE-derived rules). In cases where the packet filter matches a QoS rule in the stored derived QoS rule table, the UE may overwrite the QFI of the matched QoS rule with the QFI value QFI0 and restart the timer associated with the rule. Otherwise, the UE may add a new QoS rule (e.g., including the UE-derived uplink packet filter and the associated QFI and precedence values) and start a new timer associated with the new QoS rule.

However, in the case of an encapsulating security payload (ESP) packet, where an uplink ESP packet and/or a downlink ESP packet may be encapsulated in another packet such as a User Datagram Protocol (UDP) packet in a UDP network address translation traversal (UDP NAT-T) use case, the modem of the UE may be unable to determine an uplink security parameters index (SPI) that is needed to derive a NAS RQoS uplink packet filter. As described herein, example 700 illustrates an example in which the UE may apply the NAS RQoS procedure described above to derive an uplink packet filter based on an example downlink SDAP PDU with an SDAP header and an ESP header. For example, at 710, the UE may receive, from the RAN, a first downlink SDAP PDU with an SDAP header from a first DRB. For example, FIG. 7B illustrates an example structure 750 for the downlink SDAP PDU, which may include a one-byte downlink SDAP header that includes a QFI (e.g., QFI=3) and an RQI that is set to one (1) to indicate that RQoS processing is needed for this downlink packet. As further shown in FIG. 7B, the downlink SDAP PDU includes an IPv4 header that indicates, among other things, a protocol (e.g., 50, to indicate an ESP protocol), a source address, and a destination address. Furthermore, as shown in FIG. 7B, the downlink SDAP PDU may include an ESP header that includes a downlink SPI value (e.g., ten (10) in FIG. 7B).

Referring again to FIG. 7A, at 712, the UE may extract the QFI and the RQI from the downlink SDAP header of the downlink packet received from the RAN. In connection with the example downlink SDAP PDU shown in FIG. 7B, the QFI is three (3) and the RQI is set to one (1), whereby the UE is to derive a new uplink packet filter for the QoS flow associated with the downlink packet (e.g., the QoS flow associated with QFI=3). In this example, the downlink packet is an IPv4 ESP packet, and 5-tuple parameters indicated in the IPv4 and ESP headers include the source IP address (10.10.10.10), the destination IP address (20.20.20.20), downlink SPI (10), and protocol (50=ESP).

As shown in FIG. 7A, at 714, the UE may need to identify an uplink security association with an uplink SPI corresponding to a downlink security association with the downlink SPI indicated in the downlink packet. However, determining the uplink SPI paired with the downlink SPI may pose various challenges because the uplink ESP packets are generated by an IPsec layer (above the IP layer) after security associations are established (e.g., in the application processor). The security associations may be separate for uplink and downlink packets, whereby a bi-directional data flow may include uplink ESP packets and downlink ESP packets that use different SPI values. Accordingly, because there is no predefined correlation between uplink SPI and downlink SPI values, and only the IPsec layer knows the uplink and downlink SPI pairing explicitly, the modem may need to employ one or more techniques to learn the uplink and downlink SPI pairing to determine the uplink SPI that is needed to enable RQoS.

For example, as described in further detail below in connection with FIG. 8, the modem of the UE may monitor ESP packets on a PDU session with NAS RQoS enabled, and may store a record for each ESP packet associated with a unique combination of attributes (e.g., a unique 3-tuple including a local IP address, a remote IP address, and an uplink SPI value). The stored record may further include a downlink SPI field that is initially set to "None" or another suitable null value, and the record may include a flag initially indicating that the uplink SPI is not mapped to a downlink SPI. Accordingly, when the modem receives a downlink ESP packet and there is only one stored record that satisfies a set of mapping conditions with respect to the downlink ESP packet (e.g., there is one record that includes a local IP address and remote IP address matching the local IP address and remote IP address included in the downlink packet and/or a flag indicating that the uplink SPI is not mapped to a downlink SPI value, among other examples), the modem may update the one matching record to include a downlink SPI value included in the downlink ESP packet and to change the value of the flag to indicate that the uplink SPI is mapped to a downlink SPI value. Additionally, or alternatively, as described in further detail below in connection with FIG. 9, upon receiving a downlink ESP packet, the modem may query the upper (e.g., application or IPsec) layer to request the uplink SPI that is paired with an unmapped downlink SPI in cases where the modem and the upper layer are able to exchange control information. In this way, the UE may create an uplink packet filter to indicate that uplink ESP packets with the same local IP address, remote IP address, and the paired uplink SPI are associated with a QFI included in the received downlink ESP packet, and thereby enable RQoS for ESP packets.

For example, at 716, the UE may create an uplink packet filter based on the uplink SPI and downlink SPI pairing. For example, the uplink packet filter may include a destination IP address that corresponds to the source IP address of the downlink packet received at 710 (e.g., 10.10.10.10), a source IP address that corresponds to the destination IP address of the downlink packet received at 710 (e.g., 20.20.20.20), the uplink SPI that is paired with the downlink SPI of the downlink packet received at 710, and the protocol of the downlink packet received at 710 (e.g., 50). Furthermore, the UE may associate an identifier of the uplink packet filter (e.g., PF0) with the QFI associated with the downlink packet received (e.g., QFI=3). For example, at 718, the UE may create a new derived QoS rule that indicates the QFI and precedence value associated with the uplink packet filter (e.g., {QFI=3, precedence value=80, PF0}). In this way, when the modem receives uplink packets from the application layer that matches the uplink packet filter (e.g., the uplink packets have the same destination IP address, source IP address, uplink SPI, and protocol as the uplink packet filter associated with the identifier PF0), the UE may associate the uplink packets with the QoS flow associated with the QFI of the derived QoS rule, to thereby enable RQoS.

As indicated above, FIGS. 7A-7B are provided as an example. Other examples may differ from what is described with regard to FIGS. 7A-7B.

Figure 8:
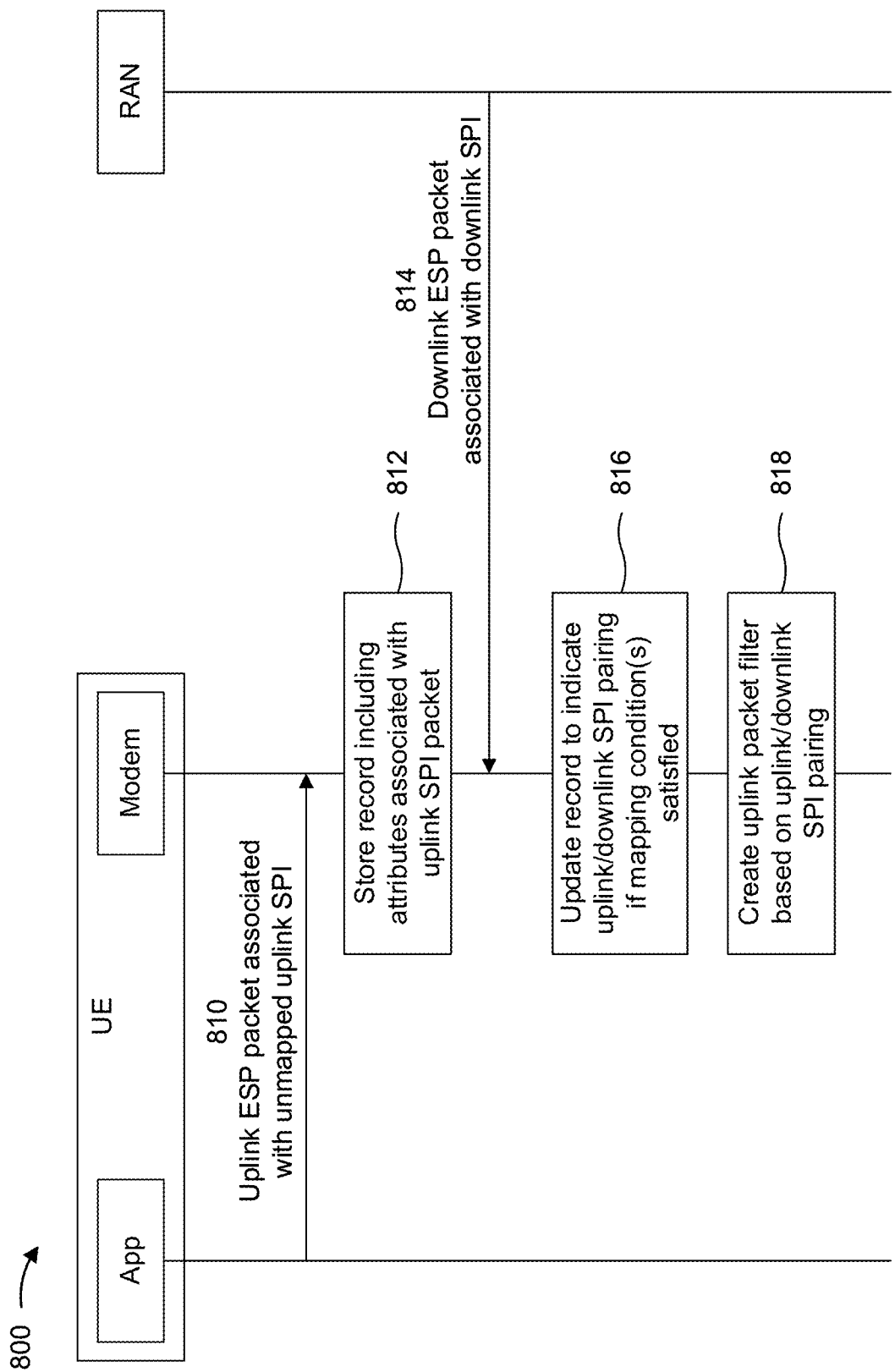
FIGS. 8-9 are diagrams illustrating examples associated with RQoS for encapsulating security payload (ESP) packets.

FIG. 8 is a diagram illustrating an example 800 associated with RQoS for ESP packets. As shown in FIG. 8, example 800 includes communication between a UE and a RAN to enable NAS RQoS for ESP packets. As shown in FIG. 8, the UE may include a modem and an upper layer (e.g., an application layer, such as an IPsec layer), where the upper layer generates uplink ESP packets and only the upper layer explicitly knows a pairing between a downlink SPI and an uplink SPI. For example, in some aspects, the upper layer may generate the uplink ESP packets in an IPsec tunnel mode, a transport mode, or another suitable mode.

In some aspects, as described herein, example 800 may be performed to enable the modem to learn one or more uplink and downlink SPI pairings in cases where the upper layer (e.g., an application processor that creates one or more security associations) cannot exchange control information with the modem. For example, the modem may be connected to a computer through a suitable interface, such as a universal serial bus (USB) port or a peripheral component interconnect express (PCIe) interface, where the upper layer is in an application processor of the computer. In this example, the upper (e.g., IPsec) layer at the computer may be unable to exchange control information with the modem. In another example, the modem may be included in a wireless customer premises equipment (CPE) or a smartphone with a wireless local area network (WLAN) hotspot, where the CPE or WLAN hotspot connects to the Internet using a wireless backhaul (e.g., over a 5G network rather than using a fixed-line backhaul such as a digital subscriber line (DSL)) and connects to one or more personal computers using an Ethernet or WLAN connection. In such cases, the upper (e.g., IPsec) layer at the personal computer may be unable to exchange control information with the modem.

Additionally, or alternatively, as described herein, example 800 may be performed to enable the modem to learn one or more uplink and downlink SPI pairings in cases where the upper layer can exchange control information with the modem (e.g., in a smartphone). In other words, example 800 may enable the modem to learn one or more uplink and downlink SPI pairings regardless of whether the upper layer and the modem can exchange control information. For example, as described herein, the upper layer may create security association pairs one at a time. Accordingly, as described herein, example 800 may enable the modem to obtain and store SPI pairing information (e.g., a pairing between an uplink SPI and a downlink SPI) for a first security association pair if the first security association pair is created before any other security association pairs for the same source IP address and destination IP pair.

For example, at 810, the modem may monitor ESP packets on one or more PDU sessions with NAS RQoS enabled, and may receive, from the upper layer, one or more uplink ESP packets. For each uplink ESP packet received at the modem, the modem may determine a set of attributes associated with the uplink ESP packet. For example, the set of attributes may include a 3-tuple that includes a local IP address (e.g., a source IP address associated with the UE), a remote IP address (e.g., a destination IP address associated with a website server), and an uplink SPI value. In some aspects, the QoS may store one or more records that correspond to sets of attributes associated with previously received uplink ESP packets (e.g., 3-tuples including local IP addresses, remote IP addresses, and uplink SPI values associated with the previously received uplink ESP packets). Accordingly, in cases where the modem receives an uplink ESP packet from the upper layer that includes a local IP address, a remote IP address, and an uplink SPI value and there is no existing record with the same local IP address, remote IP address, and uplink SPI value, the modem may determine that the uplink SPI is unmapped.

In some aspects, as further shown at 812, the modem may store a new record that includes the local IP address, the remote IP address, and the uplink SPI carried in the uplink ESP packet based on a determination that there is no existing record that includes the same set of attributes. In some aspects, the new record stored by the modem may include a flag that may be set to a first value to indicate that the uplink SPI is not mapped to a downlink SPI (e.g., IsMapped=false or IsMapped=0). Furthermore, the new record may include a downlink SPI field that is initially set to a null value because the modem has not yet found a downlink SPI paired with the uplink SPI (e.g., DL SPI=None). In some aspects, the modem may further start a timer associated with the new record, where the timer may be used to handle a failure scenario that occurs when the modem is unable to find a downlink SPI pairing for an unmapped set of attributes within a predefined or configurable time duration (e.g., an unmapped 5-tuple including a local IP address, remote IP address, uplink SPI, downlink SPI=None, and IsMapped=false or 0). Accordingly, if the modem is unable to derive the downlink SPI pairing before the timer expires, the modem may delete the record associated with the unmapped uplink SPI.

As further shown at 814, the modem may receive one or more downlink ESP packets from the RAN, where each downlink ESP packet may include a source IP address (e.g., a remote IP address with respect to the QoS), a destination IP address (e.g., a local IP address with respect to the QoS), and a downlink SPI. In some aspects, the modem may determine whether one or more stored records include a set of attributes that satisfy one or more conditions. For example, the modem may determine whether there are one or more stored records satisfying a first condition whereby the stored record(s) include the same local IP address and remote IP address as the downlink ESP packet. Furthermore, in some aspects, the modem may determine whether any such records satisfy a second condition whereby the flag is set to a value to indicate that the associated uplink SPI is not mapped to a downlink SPI (e.g., IsMapped is "false" or "0"). In some aspects, the modem may optionally further determine whether a third condition is satisfied, where the third condition may be that the downlink SPI included in the downlink ESP packet is not already mapped to an uplink SPI. In some aspects, in cases where the modem determines that there is only one stored record that satisfies the first condition and the second condition, or alternatively that there is only one stored record that satisfies the first condition, the second condition, and the third condition, the modem may determine that the downlink SPI in the downlink ESP packet is paired with the uplink SPI in the one stored record if the timer associated with the record has not expired. In such cases, when all applicable mapping conditions and/or criteria are satisfied, the modem may update the record to indicate the uplink and downlink SPI pairing, as shown at 816. For example, the modem may update the record to include the downlink SPI in the downlink ESP packet and may set the flag to a value indicating that the uplink SPI is mapped to a downlink SPI (e.g., IsMapped=true or 1). Alternatively, if there are no stored records satisfying the conditions described above or there are two or more stored records satisfying the conditions described above, the modem may be unable to determine the correct uplink and downlink SPI pairing.

The logic that the modem employs to derive the uplink and downlink SPI pairing for ESP packets will now be explained with reference to an example sequence of uplink and downlink ESP packets. For example, the upper layer of the QoS may send a first uplink ESP packet with a local IP address (e.g., IP_A), a remote IP address (e.g., IP_B), and an uplink SPI value (e.g., UL SPI=SPI_0). To derive a first security association pairing, based on a determination that there are no stored records including the local IP address, the remote IP address, and the uplink SPI included in the uplink ESP packet, the modem may store a new record structured as follows:

| Local IP = | Remote IP = | UL SPI = | DL SPI = | IsMapped = |
|---|---|---|---|---|
| IP_A | IP_B | SPI_0 | None | False |

In some aspects, the modem may then receive a first downlink ESP packet with a local IP address (e.g., IP_A), a remote IP address (e.g., IP_B), and a downlink SPI value (e.g., DL SPI=SPI_1). In this case, there is only one record with the same local IP address and remote IP address and a flag indicating that the associated uplink SPI is unmapped. Accordingly, the modem updates the record to map the downlink SPI in the downlink ESP packet with the uplink SPI of the first uplink ESP packet, as follows:

| Local IP = | Remote IP = | UL SPI = | DL SPI = | IsMapped = |
|---|---|---|---|---|
| IP_A | IP_B | SPI_0 | SPI_1 | True |

In some aspects, the modem may then receive additional uplink ESP packets with the same local IP address (e.g., IP_A), remote IP address (e.g., IP_B), and uplink SPI value (e.g., UL SPI=SPI_0). In this case, the modem does not perform an update because the 3-tuple of the local IP address, remote IP address, and uplink SPI is already paired with a downlink SPI. Furthermore, in cases where the modem receives additional downlink ESP packets with the same local IP address (e.g., IP_A), remote IP address (e.g., IP_B), and downlink SPI value (e.g., DL SPI=SPI_1), no update occurs because the 3-tuple of the local IP address, remote IP address, and downlink SPI is already paired with an uplink SPI. However, when the modem receives an uplink ESP packet with a different 3-tuple (e.g., local IP address=IP_A, remote IP address=IP_B, and UL SPI=SPI_2), the modem may store a new record to try to derive a second security association pairing, as follows:

| Local IP = | Remote IP = | UL SPI = | DL SPI = | IsMapped = |
|---|---|---|---|---|
| IP_A | IP_B | SPI_0 | SPI_1 | True |
| IP_A | IP_B | SPI_2 | None | False |

In some aspects, the modem may then receive a downlink ESP packet with a local IP address (e.g., IP_A), a remote IP address (e.g., IP_B), and a downlink SPI value (e.g., DL SPI=SPI_3). In this case, there is only one record with the same local IP address and remote IP address and a flag indicating that the associated uplink SPI is unmapped. Accordingly, the modem updates the second record to map the downlink SPI in the downlink ESP packet with the unmapped uplink SPI, as follows:

| Local IP = | Remote IP = | UL SPI = | DL SPI = | IsMapped = |
|---|---|---|---|---|
| IP_A | IP_B | SPI_0 | SPI_1 | True |
| IP_A | IP_B | SPI_2 | SPI_3 | True |

Accordingly, at 818, the QoS may create an uplink packet filter based on the uplink SPI and downlink SPI pairings that are found using the logic described above. For example, for the first record, a first uplink packet filter (denoted as PF0) may include a destination IP address that corresponds to the remote IP address (e.g., IP_B), a source IP address that corresponds to the local IP address (e.g., IP_A), the uplink SPI (e.g., SPI_0), and an identifier of the ESP protocol (e.g., 50). Furthermore, the QoS may associate the first uplink packet filter with the QFI associated with the downlink packet that included the downlink SPI paired with the uplink SPI and may create a first derived QoS rule that indicates the QFI and precedence value associated with the first uplink packet filter PF0 (e.g., the first derived QoS rule may be {QFI=3, precedence value=80, PF0}). Similarly, for the second record, a second uplink packet filter (denoted as PF1) may include a destination IP address that corresponds to the remote IP address (e.g., IP_B), a source IP address that corresponds to the local IP address (e.g., IP_A), the uplink SPI (e.g., SPI_2), and an identifier of the ESP protocol (e.g., 50). Furthermore, the UE may associate the second uplink packet filter PF1 with the QFI associated with the downlink packet that included the downlink SPI paired with the uplink SPI and may create a second derived QoS rule that indicates the QFI and precedence value associated with the second uplink packet filter PF1, (e.g., the second derived QoS rule may be {QFI=2, precedence value=80, PF1}). In this way, when the modem receives uplink ESP packets from the application layer that match an uplink packet filter in a derived QoS rule (e.g., the uplink ESP packets have the same destination IP address, source IP address, uplink SPI, and protocol as the uplink packet filter), the UE may associate the uplink ESP packets with the QoS flow that corresponds to the QFI of the derived QoS rule, to enable RQoS.

As indicated above, FIG. 8 is provided as an example. Other examples may differ from what is described with regard to FIG. 8.

Figure 9:
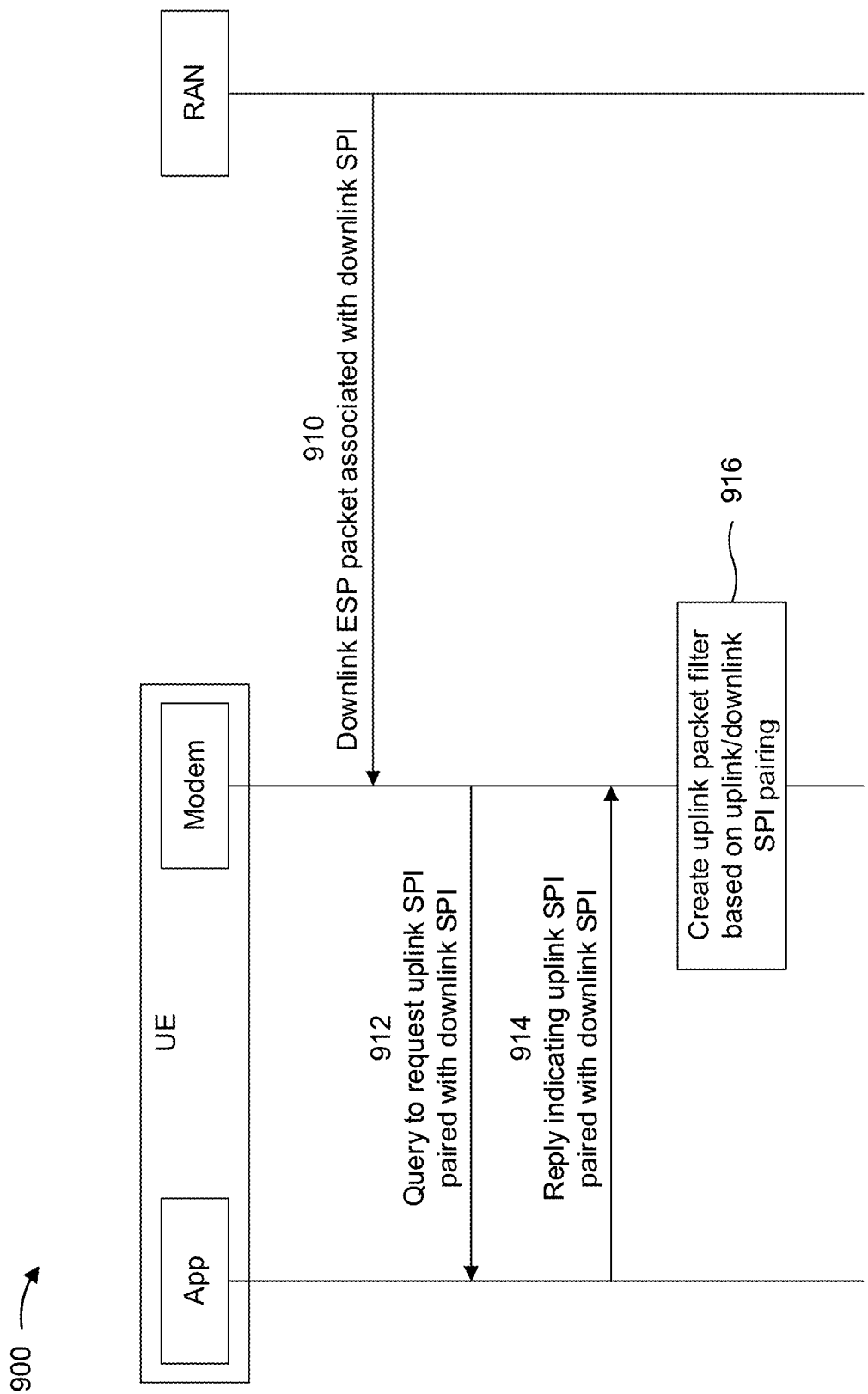

FIG. 9 is a diagram illustrating an example 900 associated with RQoS for ESP packets. As shown in FIG. 9, example 900 includes communication between a UE and a RAN to enable NAS RQoS for ESP packets. As shown in FIG. 9, the UE may include a modem and an upper layer (e.g., an application layer, such as an IPsec layer), where the upper layer generates uplink ESP packets and only the upper layer explicitly knows a pairing between a downlink SPI and an uplink SPI. For example, in some aspects, the upper layer may generate the uplink ESP packets in an IPsec tunnel mode, a transport mode, or another suitable mode. In some aspects, as described herein, example 900 may be performed to enable the modem to learn one or more uplink and downlink SPI pairings when the upper layer (e.g., an application processor that creates one or more security associations) can exchange control information with the modem (e.g., in a smartphone).

For example, at 910, the modem may receive, from the RAN, one or more downlink ESP packets. For each downlink ESP packet received at the modem, the modem may determine a set of attributes associated with the downlink ESP packet. For example, the set of attributes may include a 3-tuple that includes a destination IP address (e.g., a local IP address associated with the UE), a source IP address (e.g., a remote IP address associated with a remote website server), and a downlink SPI value. In some aspects, the UE may determine that the downlink ESP packet is not mapped or associated with an uplink SPI based on a determination there is no existing uplink packet filter that includes the same set of attributes as the received downlink ESP packet. Accordingly, in cases where the modem receives a downlink ESP packet from the RAN that includes a local IP address, a remote IP address, and a downlink SPI value and there is no existing uplink packet filter with the same local IP address, the same remote IP address, and an uplink SPI value mapped to the downlink SPI value, the modem may determine that the downlink SPI is unmapped to an uplink SPI.

For example, in some aspects, the modem may monitor downlink ESP packets on one or more PDU sessions with NAS RQoS enabled, and the modem may determine, for each observed downlink ESP packet, whether a header of the downlink ESP packet includes an indicator to derive one or more QoS rules. In cases where the header includes the indicator to derive one or more QoS rules, the modem may check whether there is a local record (e.g., including a local IP address, a remote IP address, an uplink SPI, and/or a downlink SPI) matching a set of attributes associated with the downlink ESP packet (e.g., the local IP address of the record matches the local IP address included in the downlink ESP packet, the remote IP address of the record matches the remote IP address included in the downlink ESP packet, and the downlink SPI of the record matches the SPI included in the downlink ESP packet). In cases where no match is found, the modem may determine that the downlink SPI is unmapped to an uplink SPI. Otherwise, in cases where a match is found, the modem may use the uplink SPI included in the matched local record for RQoS processing.

In some aspects, at 912, the modem may query the upper layer (e.g., an IPsec layer) to request the uplink SPI associated with a given 3-tuple that includes a local IP address, a remote IP address, and downlink SPI based on a determination that the downlink SPI in a given downlink ESP packet is unmapped to an uplink SPI. For example, as described above, the upper layer may create the security associations, and may therefore know the uplink and downlink SPI pairings explicitly. Accordingly, in cases where the modem and the upper layer are able to exchange control information over a suitable interface, the modem may query the upper layer to request the uplink SPI paired with a given local IP address, remote IP address, and downlink SPI value included in the downlink ESP packet, and the upper layer may reply to the query to indicate the uplink SPI paired with the unmapped downlink SPI at 914.

Accordingly, at 916, the UE may create an uplink packet filter based on the uplink SPI and downlink SPI pairing that is determined by querying the upper layer. For example, the uplink packet filter may include a destination IP address that corresponds to the remote IP address of the downlink ESP packet (e.g., the IP address of a remote website server), a source IP address that corresponds to the local IP address of the downlink ESP packet (e.g., the IP address of the UE), the uplink SPI paired with the downlink SPI of the downlink ESP packet, and an identifier of the ESP protocol. Furthermore, the UE may associate the uplink packet filter with a QFI included in the downlink ESP packet, and the UE may create a derived QoS rule that indicates the QFI, the uplink packet filter, and the precedence value associated with the QoS rule. In this way, when the modem receives uplink ESP packets from the application layer that match the derived QoS rule (e.g., the uplink packets have the same destination IP address, source IP address, uplink SPI, and protocol as the uplink packet filter of the derived QoS rule), the UE may apply the matched QoS rule to associate the uplink ESP packet with the QoS flow that corresponds to the QFI of the derived QoS rule, to thereby enable RQoS. Furthermore, in response to the upper layer provided uplink SPI, the modem may create a new local record including a local IP address, a remote IP address, an uplink SPI, and downlink SPI, where the local IP address of the record is set to the local IP address included in the downlink ESP packet, the remote IP address of the record is set to the remote IP address included in the downlink ESP packet, the uplink SPI of the record is set to the uplink SPI paired with the downlink SPI included in the downlink ESP packet, which is provided by the upper layer query response, and the downlink SPI of the record is set to the SPI included in the downlink ESP packet. In this way, the local record may be matched to subsequent downlink ESP packets to enable RQoS processing.

In an example implementation of the logic used to learn one or more uplink and downlink SPI pairings in cases where the upper layer can exchange control information with the modem, the UE may receive a first downlink ESP packet with a first local IP address (IP_A) a first remote IP address (IP_B), and a downlink SPI (SPI_1). The UE may fail to find a matching local record, whereby the modem may query the upper layer, which may know that the downlink SPI (SPI_1) is paired with an uplink SPI (SPI_0). The modem may then create or update a local record with the first local IP address (IP_A), the first remote IP address (IP_B), the uplink SPI paired with the downlink SPI of the first downlink ESP packet (SPI_0), and the downlink SPI of the downlink ESP packet (SPI_1). The UE may then receive one or more additional downlink ESP packets with the first local IP address, the first remote IP address, and the downlink SPI. In this case, a match is found in the local record, and the modem may use the uplink SPI included in the matching local record for RQoS processing. In cases where the UE then receives a downlink ESP packet with the first local IP address (IP_A), the first remote IP address (IP_B), and a second downlink SPI (e.g., SPI_3), no match would be found in the local record, so the modem may again query the upper layer, which knows that the second downlink SPI (SPI_3) is paired with a second uplink SPI (e.g., SPI_2). Accordingly, the modem may update the local record, which may include a first record associating the first local IP address and the first remote IP address with the first downlink SPI and the first uplink SPI, and a second record associating the first local IP address and the first remote IP address with the second downlink SPI and the second uplink SPI.

As indicated above, FIG. 9 is provided as an example. Other examples may differ from what is described with regard to FIG. 9.

Figure 10:
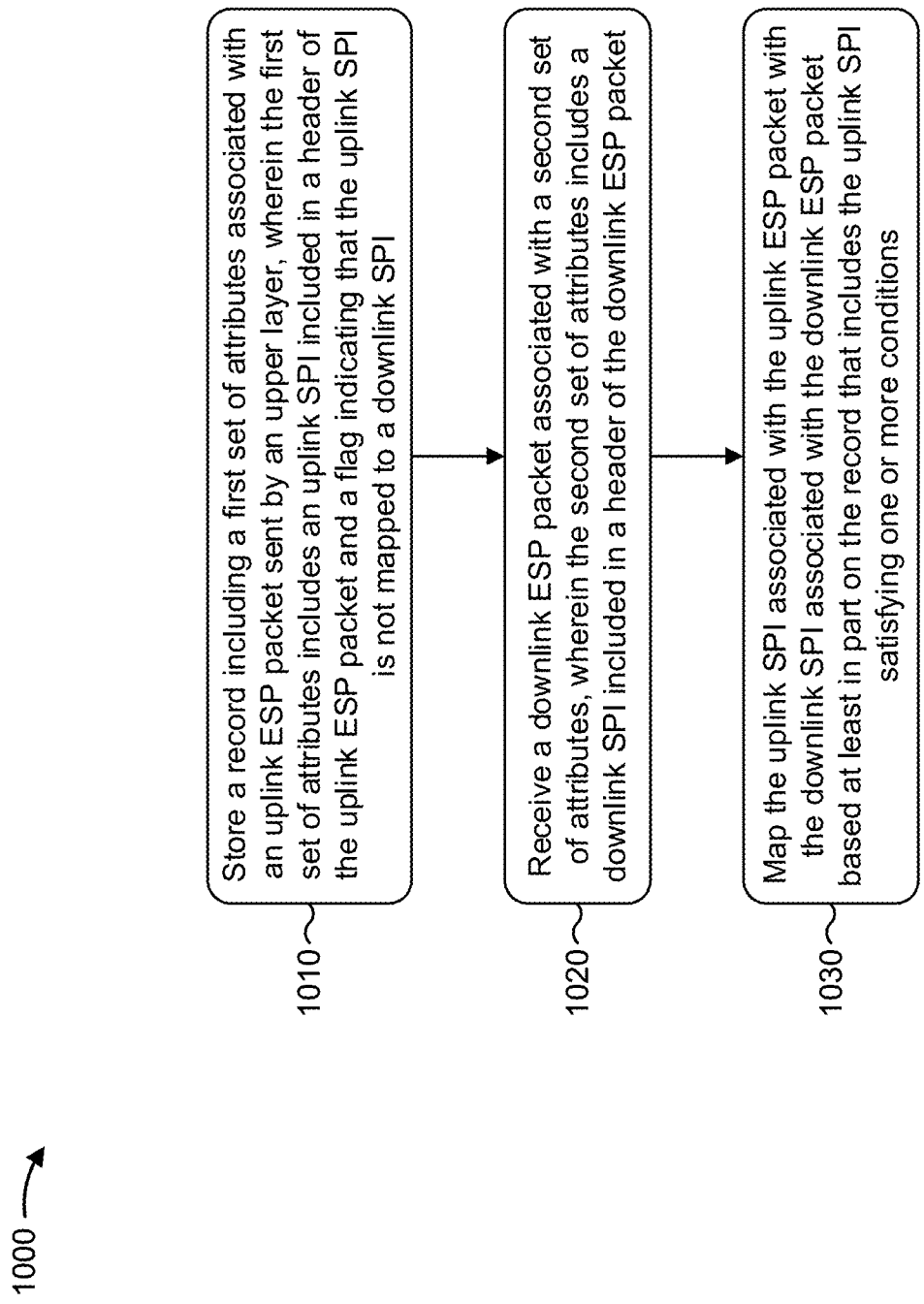
FIGS. 10-12 are flowcharts of example methods of wireless communication.

FIG. 10 is a flowchart of an example method 1000 of wireless communication. The method 1000 may be performed by, for example, a UE (e.g., a modem of UE 120).

At 1010, the UE may store a record including a first set of attributes associated with an uplink ESP packet sent by an upper layer of the UE, wherein the first set of attributes includes an uplink SPI included in a header of the uplink ESP packet and a flag indicating that the uplink SPI is not mapped to a downlink SPI. For example, the UE (e.g., using communication manager 140 and/or SPI mapping component 1208, depicted in FIG. 12) may store a record including a first set of attributes associated with an uplink ESP packet sent by an upper layer of the UE, wherein the first set of attributes includes an uplink SPI included in a header of the uplink ESP packet and a flag indicating that the uplink SPI is not mapped to a downlink SPI, as described above in connection with, for example, FIG. 8 at 810 and 812. In some aspects, one or more of the uplink ESP packet or the downlink ESP packet is encapsulated in another packet. In some aspects, the modem and the upper layer are associated with a configuration that does not permit exchanging control information between the modem and the upper layer. In some aspects, the modem and the upper layer are associated with a configuration that permits exchanging control information between the modem and the upper layer.

At 1020, the UE may receive a downlink ESP packet associated with a second set of attributes, wherein the second set of attributes includes a downlink SPI included in a header of the downlink ESP packet. For example, the UE (e.g., using communication manager 140 and/or reception component 1202, depicted in FIG. 12) may receive a downlink ESP packet associated with a second set of attributes, wherein the second set of attributes includes a downlink SPI included in a header of the downlink ESP packet, as described above in connection with, for example, FIG. 8 at 814.

At 1030, the UE may map the uplink SPI associated with the uplink ESP packet with the downlink SPI associated with the downlink ESP packet based at least in part on the record that includes the uplink SPI satisfying one or more conditions. For example, the UE (e.g., using communication manager 140 and/or SPI mapping component 1208, depicted in FIG. 12) may map the uplink SPI associated with the uplink ESP packet with the downlink SPI associated with the downlink ESP packet based at least in part on the record that includes the uplink SPI satisfying one or more conditions, as described above in connection with, for example, FIG. 8 at 816. In some aspects, mapping the uplink SPI associated with the uplink ESP packet with the downlink SPI associated with the downlink ESP packet includes updating the first set of attributes to include the downlink SPI included in the second set of attributes associated with the downlink ESP packet, and updating the flag to indicate that the uplink SPI is mapped to a downlink SPI.

In some aspects, the one or more conditions include that the first set of attributes associated with the record satisfies one or more mapping criteria and that no other record includes a set of attributes that satisfies the one or more mapping criteria. In some aspects, the one or more mapping criteria include the first set of attributes having a first local IP address that matches a second local IP address included in the second set of attributes associated with the downlink ESP packet and the first set of attributes having a first remote IP address that matches a second remote IP address included in the second set of attributes associated with the downlink ESP packet. In some aspects, the one or more mapping criteria include the flag having a value to indicate that the uplink SPI is not mapped to a downlink SPI. In some aspects, the one or more mapping criteria include the downlink SPI not being mapped to any uplink SPI. In some aspects, the one or more conditions include that the downlink ESP packet associated with the downlink SPI is received prior to expiration of a timer associated with the record that includes the first set of attributes.

In some aspects, method 1000 includes creating, based at least in part on the downlink ESP packet, an uplink packet filter that includes an SPI value set to the uplink SPI mapped to the downlink SPI associated with the downlink ESP packet, a destination IP address set to a source IP address in the header of the downlink ESP packet, a source IP address set to a destination IP address in the header of the downlink ESP packet, and a protocol value set to a protocol parameter in the header of the downlink ESP packet; and creating a QoS rule that includes the uplink packet filter, a QFI set to a QFI parameter in an SDAP header of the downlink ESP packet, and a precedence value set to a predefined value. In some aspects, method 1000 includes receiving an uplink application packet, determining that the uplink application packet includes a set of parameters that matches the uplink packet filter in the QoS rule, and associating the uplink application packet with the QFI in the QoS rule.

In some aspects, method 1000 includes determining, based at least in part on receiving a configuration message or deriving a new QoS flow to DRB mapping rule, that a DRB mapping rule associated with a QFI has changed, and refraining from transmitting an end-marker SDAP control PDU on a current DRB associated with the QFI based at least in part on determining that the QFI is not associated with an uplink packet filter.

Although FIG. 10 shows example blocks of method 1000, in some aspects, method 1000 may include additional blocks, fewer blocks, different blocks, or differently arranged blocks than those depicted in FIG. 10. Additionally, or alternatively, two or more of the blocks of method 1000 may be performed in parallel.

Figure 11:
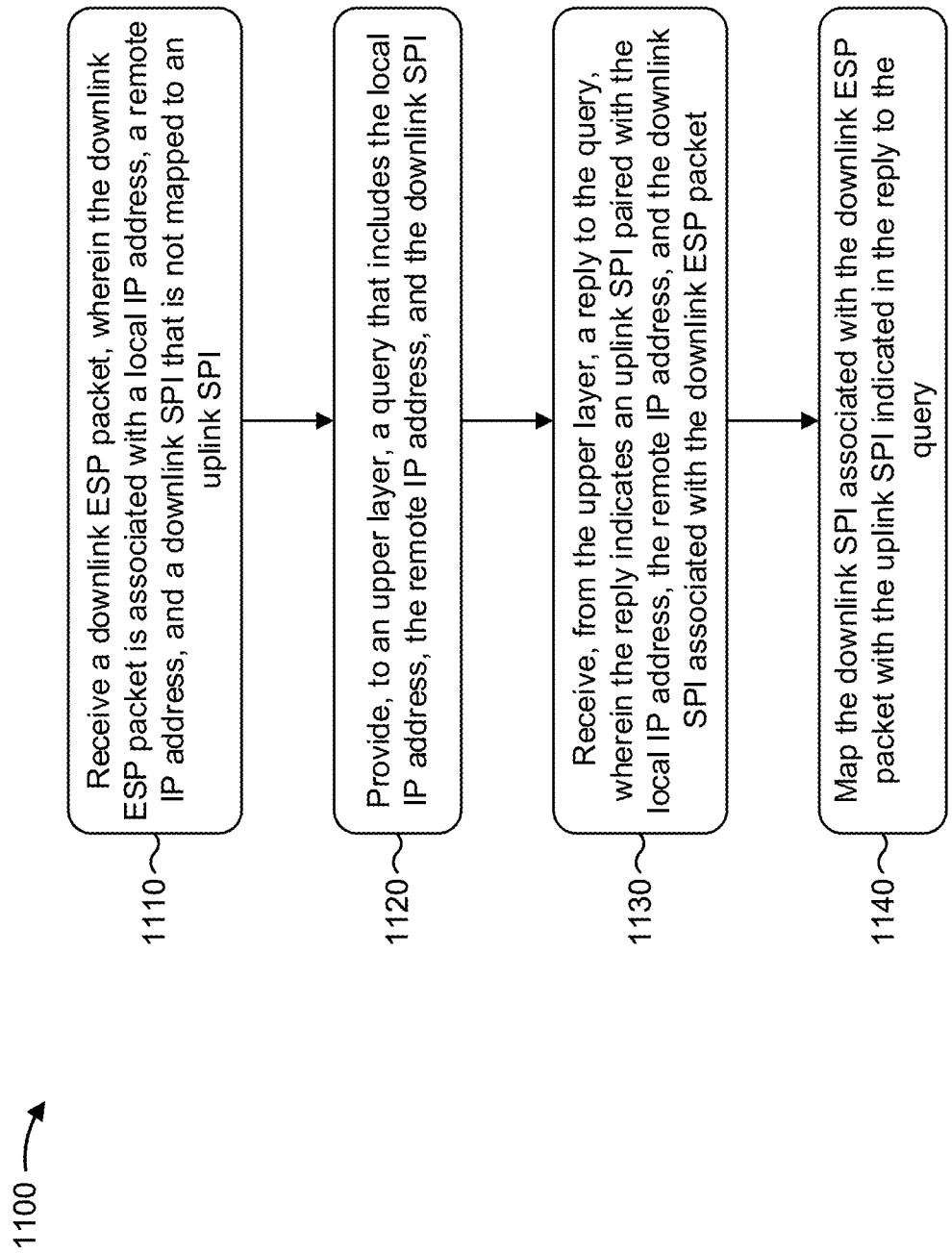

FIG. 11 is a flowchart of an example method 1100 of wireless communication. The method 1100 may be performed by, for example, a UE (e.g., a modem of UE 120).

At 1110, the UE may receive a downlink ESP packet, wherein the downlink ESP packet is associated with a local IP address, a remote IP address, and a downlink SPI that is not mapped to an uplink SPI. For example, the UE (e.g., using communication manager 140 and/or SPI mapping component 1208, depicted in FIG. 12) may receive a downlink ESP packet, wherein the downlink ESP packet is associated with a local IP address, a remote IP address, and a downlink SPI that is not mapped to an uplink SPI, as described above in connection with, for example, FIG. 9 at 910. In some aspects, the modem and the upper layer are associated with a configuration that permits exchanging control information between the modem and the upper layer.

At 1120, the UE may provide, to the upper layer, a query that includes the local IP address, the remote IP address, and the downlink SPI. For example, the UE (e.g., using communication manager 140 and/or SPI mapping component 1208, depicted in FIG. 12) may provide, to the upper layer, a query that includes the local IP address, the remote IP address, and the downlink SPI, as described above in connection with, for example, FIG. 9 at 912.

At 1130, the UE may receive, from the upper layer, a reply to the query, wherein the reply indicates an uplink SPI paired with the local IP address, the remote IP address, and the downlink SPI associated with the downlink ESP packet. For example, the UE (e.g., using communication manager 140 and/or SPI mapping component 1208, depicted in FIG. 12) may receive a reply to the query, wherein the reply indicates an uplink SPI paired with the local IP address, the remote IP address, and the downlink SPI associated with the downlink ESP packet, as described above in connection with, for example, FIG. 9 at 914.

At 1140, the UE may map the downlink SPI associated with the downlink ESP packet with the uplink SPI indicated in the reply to the query. For example, the UE (e.g., using communication manager 140 and/or SPI mapping component 1208, depicted in FIG. 12) may map the downlink SPI associated with the downlink ESP packet with the uplink SPI indicated in the reply to the query, as described above in connection with, for example, FIG. 9 at 916.

In some aspects, method 1100 includes creating, based at least in part on the downlink ESP packet, an uplink packet filter that includes an SPI value set to the uplink SPI mapped to the downlink SPI associated with the downlink ESP packet, a destination IP address set to a source IP address in the header of the downlink ESP packet, a source IP address set to a destination IP address in the header of the downlink ESP packet, and a protocol value set to a protocol parameter in the header of the downlink ESP packet, and creating a QoS rule that includes the uplink packet filter, a QFI set to a QFI parameter in an SDAP header of the downlink ESP packet, and a precedence value set to a predefined value. In some aspects, method 1100 includes receiving an uplink application packet, determining that the uplink application packet includes a set of parameters that matches the uplink packet filter in the QoS rule, and associating the uplink application packet with the QFI in the QoS rule.

Although FIG. 11 shows example blocks of method 1100, in some aspects, method 1100 may include additional blocks, fewer blocks, different blocks, or differently arranged blocks than those depicted in FIG. 11. Additionally, or alternatively, two or more of the blocks of method 1100 may be performed in parallel.

Figure 12:
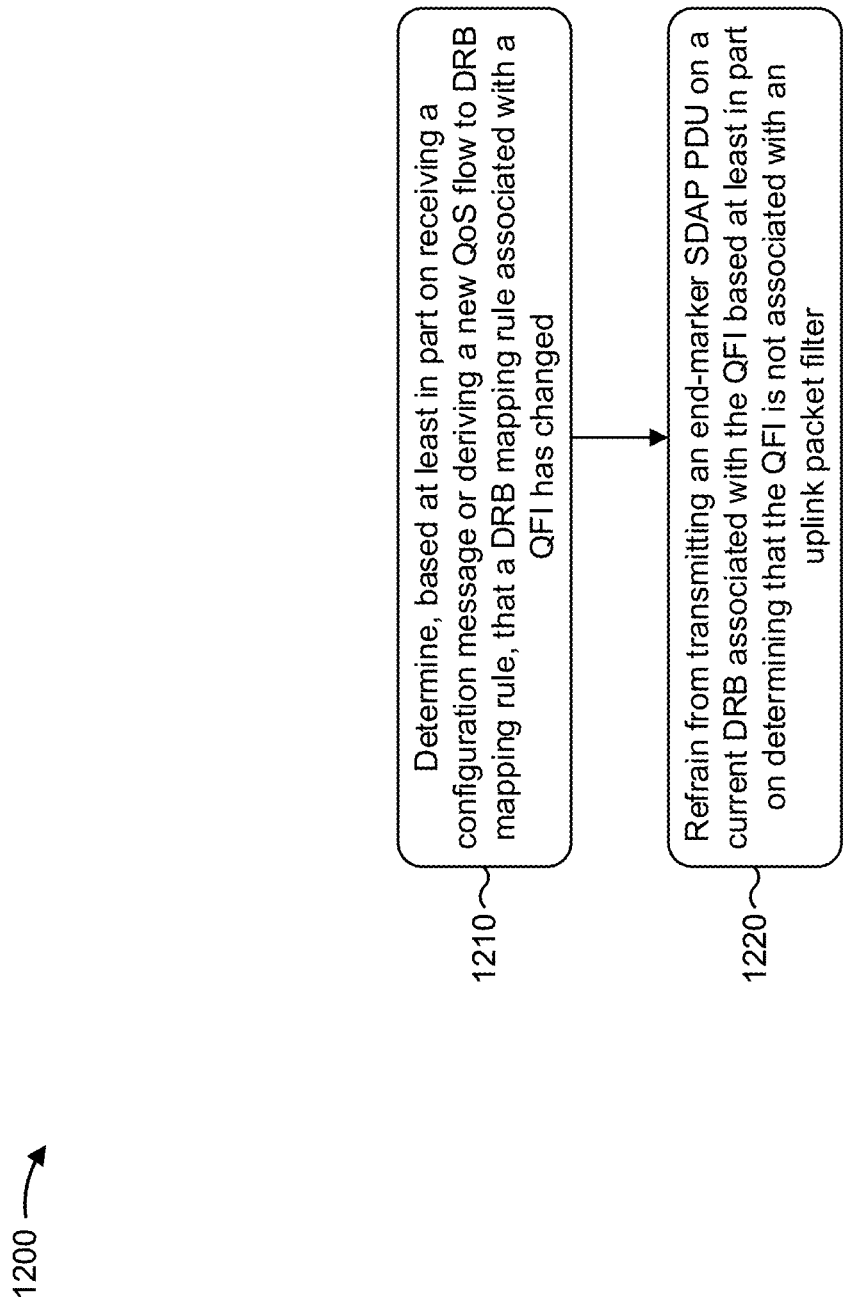

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of an SPI mapping component 1208 or an RQoS component 1210, among other examples.

In some aspects, the apparatus 1200 may be configured to perform one or more operations described herein in connection with FIGS. 7-9. Additionally, or alternatively, the apparatus 1200 may be configured to perform one or more methods described herein, such as method 1000 of FIG. 10, method 1100 of FIG. 11, method 1200 of FIG. 12, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The SPI mapping component 1208 may store a record including a first set of attributes associated with an uplink ESP packet sent by an upper layer, wherein the first set of attributes includes an uplink SPI included in a header of the uplink ESP packet and a flag indicating that the uplink SPI is not mapped to a downlink SPI. The reception component 1202 may receive a downlink ESP packet associated with a second set of attributes, wherein the second set of attributes includes a downlink SPI included in a header of the downlink ESP packet. The SPI mapping component 1208 may map the uplink SPI associated with the uplink ESP packet with the downlink SPI associated with the downlink ESP packet based at least in part on the record that includes the uplink SPI satisfying one or more conditions.

The RQoS component 1210 may create, based at least in part on the downlink ESP packet, an uplink packet filter that includes an SPI value set to the uplink SPI mapped to the downlink SPI associated with the downlink ESP packet, a destination IP address set to a source IP address in the header of the downlink ESP packet, a source IP address set to a destination IP address in the header of the downlink ESP packet, and a protocol value set to a protocol parameter in the header of the downlink ESP packet. The RQoS component 1210 may create a QoS rule that includes the uplink packet filter, a QFI set to a QFI parameter in a SDAP header of the downlink ESP packet, and a precedence value set to a predefined value.

The RQoS 1208 may receive an uplink application packet. The RQoS component 1208 may determine that the uplink application packet includes a set of parameters that matches the uplink packet filter in the QoS rule. The RQoS component 1208 may associate the uplink application packet with the QFI in the QoS rule.

The SPI mapping component 1208 may receive a downlink ESP packet, wherein the downlink ESP packet is associated with a local IP address, a remote IP address, and a downlink SPI that is not mapped to an uplink SPI. The SPI mapping component 1208 may provide, to the upper layer, a query that includes the local IP address, the remote IP address, and the downlink SPI. The SPI mapping component 1208 may receive a reply to the query, wherein the reply indicates an uplink SPI paired with the local IP address, the remote IP address, and the downlink SPI associated with the downlink ESP packet. The SPI mapping component 1208 may map the downlink SPI associated with the downlink ESP packet with the uplink SPI indicated in the reply to the query.

The communication manager 140 may determine, based at least in part on receiving a configuration message or deriving a new QoS flow to DRB mapping rule, that a DRB mapping rule associated with a QFI has changed. The transmission component 1204 may refrain from transmitting an end-marker SDAP control PDU on a current DRB associated with the QFI based at least in part on determining that the QFI is not associated with an uplink packet filter.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
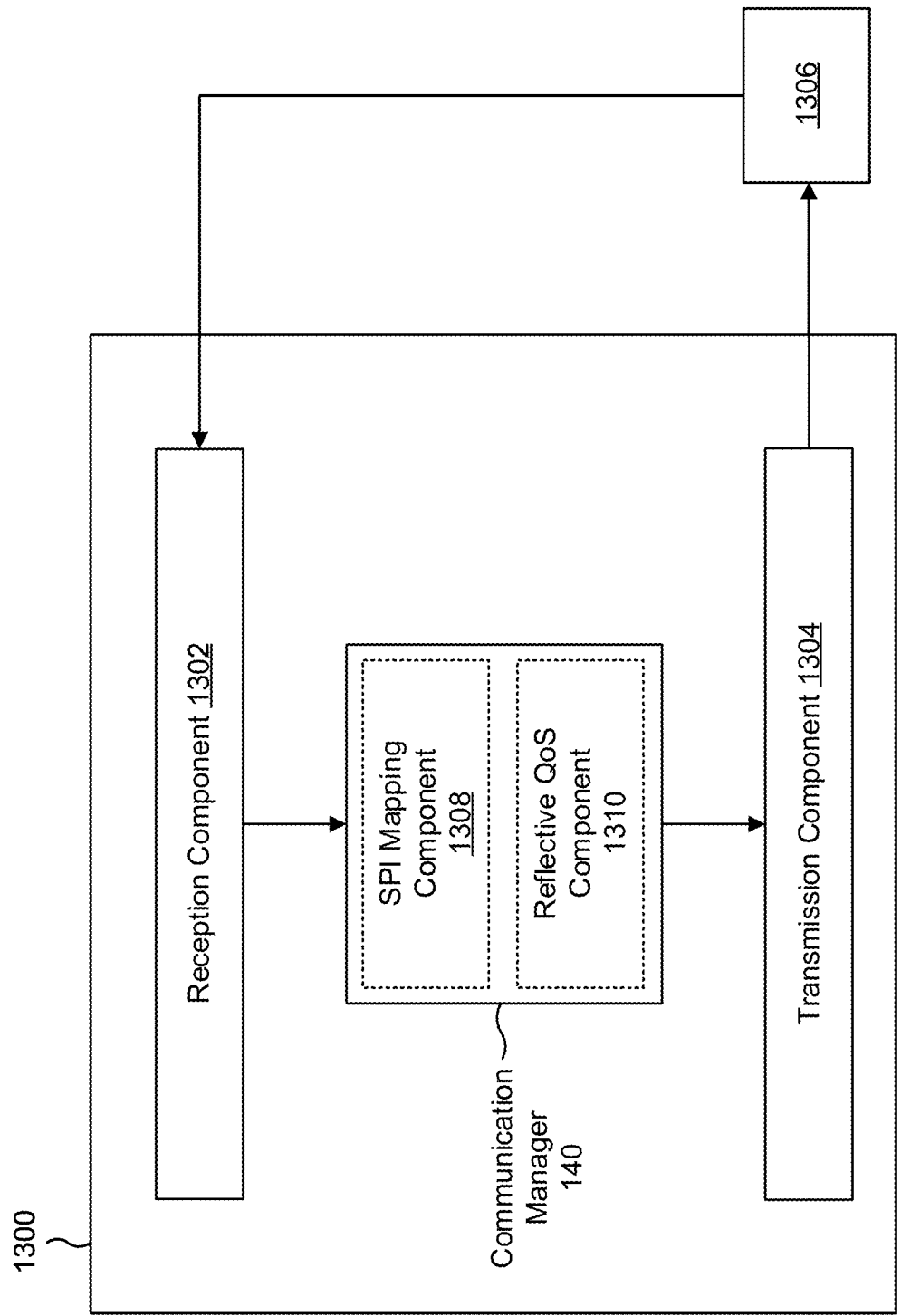
FIG. 13 is a diagram of an example apparatus for wireless communication.
Figure 14:
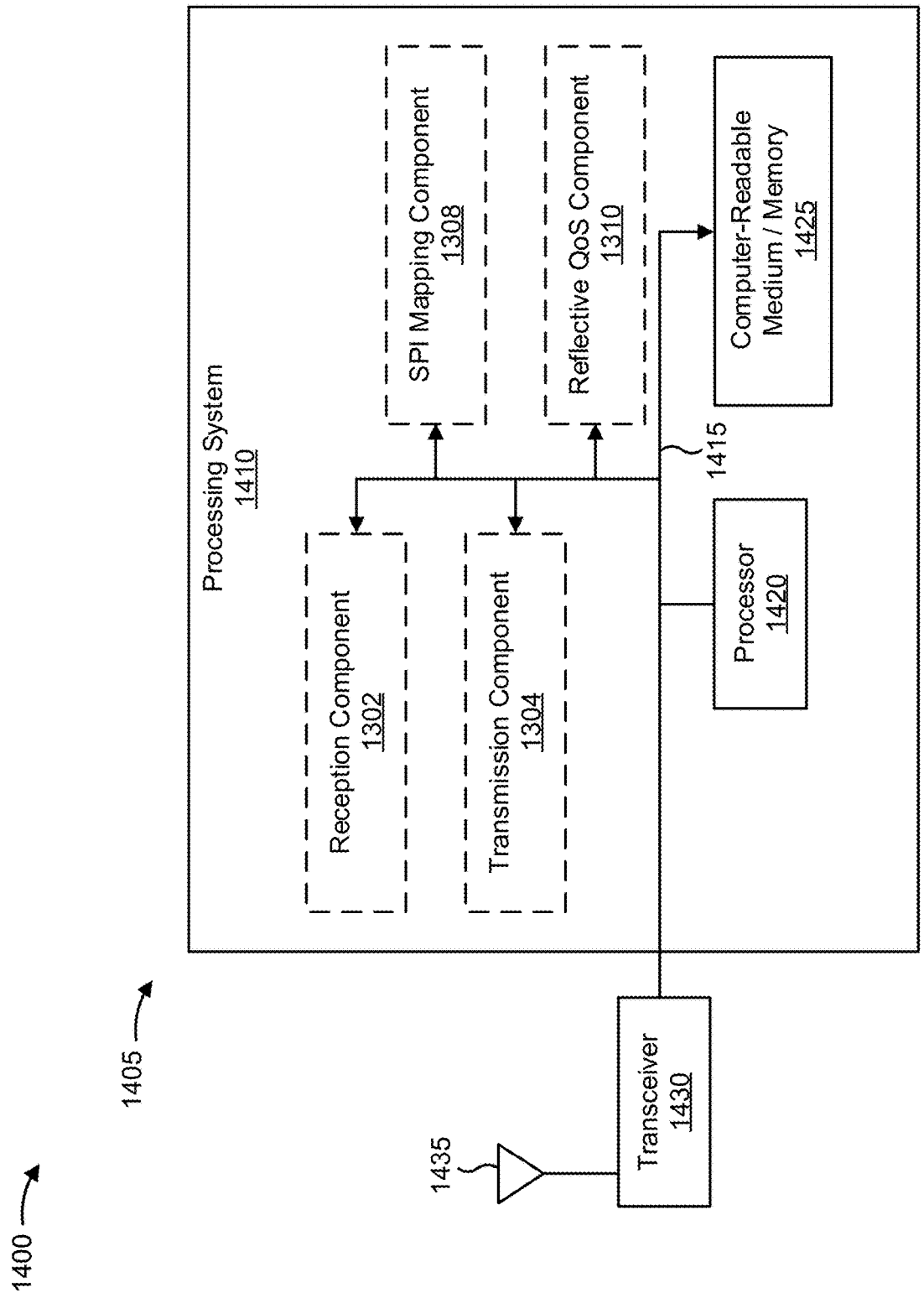
FIG. 14 is a diagram illustrating an example of a hardware implementation for an apparatus employing a processing system.

FIG. 13 is a diagram illustrating an example 1300 of a hardware implementation for an apparatus 1305 employing a processing system 1310. The apparatus 1305 may be a UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication includes means for storing a record including a first set of attributes associated with an uplink ESP packet sent by an upper layer of the UE 120, wherein the first set of attributes includes an uplink SPI included in a header of the uplink ESP packet and a flag indicating that the uplink SPI is not mapped to a downlink SPI; means for receiving a downlink ESP packet associated with a second set of attributes, wherein the second set of attributes includes a downlink SPI included in a header of the downlink ESP packet; and/or means for mapping the uplink SPI associated with the uplink ESP packet with the downlink SPI associated with the downlink ESP packet based at least in part on the record that includes the uplink SPI satisfying one or more conditions.

Additionally, or alternatively, in some aspects, the apparatus 1305 for wireless communication includes means for receiving a downlink ESP packet, wherein the downlink ESP packet is associated with a local IP address, a remote IP address, and a downlink SPI that is not mapped to an uplink SPI; means for providing, to the upper layer, a query that includes the local IP address, the remote IP address, and the downlink SPI; means for receiving, from the upper layer, a reply to the query, wherein the reply indicates an uplink SPI paired with the local IP address, the remote IP address, and the downlink SPI associated with the uplink ESP packet; and/or means for mapping the downlink SPI associated with the downlink ESP packet with the uplink SPI indicated in the reply to the query.

Additionally, or alternatively, in some aspects, the apparatus 1305 for wireless communication includes means for determining, based at least in part on receiving a configuration message or deriving a new QoS flow to DRB mapping rule, that a DRB mapping rule associated with a QFI has changed; and/or means for refraining from transmitting an end-marker SDAP control PDU on a current DRB associated with the QFI based at least in part on determining that the QFI is not associated with an uplink packet filter.

The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

The following provides an overview of some Aspects of the present disclosure:

Aspect 1: A method of wireless communication performed by a UE, comprising: storing a record including a first set of attributes associated with an uplink ESP packet sent by an upper layer of the UE, wherein the first set of attributes includes an uplink SPI included in a header of the uplink ESP packet and a flag indicating that the uplink SPI is not mapped to a downlink SPI; receiving a downlink ESP packet associated with a second set of attributes, wherein the second set of attributes includes a downlink SPI included in a header of the downlink ESP packet; and mapping the uplink SPI associated with the uplink ESP packet with the downlink SPI associated with the downlink ESP packet based at least in part on the record that includes the uplink SPI satisfying one or more conditions.

Aspect 2: The method of Aspect 1, wherein mapping the uplink SPI associated with the uplink ESP packet with the downlink SPI associated with the downlink ESP packet includes: updating the first set of attributes to include the downlink SPI included in the second set of attributes associated with the downlink ESP packet; and updating the flag to indicate that the uplink SPI is mapped to a downlink SPI.

Aspect 3: The method of any of Aspects 1-2, wherein the one or more conditions include that the first set of attributes associated with the record satisfies one or more mapping criteria and that no other record includes a set of attributes that satisfies the one or more mapping criteria.

Aspect 4: The method of Aspect 3, wherein the one or more mapping criteria include the first set of attributes having a first local IP address that matches a second local IP address included in the second set of attributes associated with the downlink ESP packet, and the first set of attributes having a first remote IP address that matches a second remote IP address included in the second set of attributes associated with the downlink ESP packet.

Aspect 5: The method of any of Aspects 3-4, wherein the one or more mapping criteria include the flag having a value to indicate that the uplink SPI is not mapped to a downlink SPI.

Aspect 6: The method of any of Aspects 3-5, wherein the one or more mapping criteria include the downlink SPI not being mapped to any uplink SPI.

Aspect 7: The method of any of Aspects 3-6, wherein the one or more conditions include that the downlink ESP packet associated with the downlink SPI is received prior to expiration of a timer associated with the record that includes the first set of attributes.

Aspect 8: The method of any of Aspects 1-7, further comprising: creating, based at least in part on the downlink ESP packet, an uplink packet filter that includes an SPI value set to the uplink SPI mapped to the downlink SPI associated with the downlink ESP packet, a destination IP address set to a source IP address in the header of the downlink ESP packet, a source IP address set to a destination IP address in the header of the downlink ESP packet, and a protocol value set to a protocol parameter in the header of the downlink ESP packet; and creating a QoS rule that includes the uplink packet filter, a QFI set to a QFI parameter in an SDAP header of the downlink ESP packet, and a precedence value set to a predefined value.

Aspect 9: The method of Aspect 8, further comprising: receiving an uplink application packet; determining that the uplink application packet includes a set of parameters that matches the uplink packet filter in the QoS rule; and associating the uplink application packet with the QFI in the QoS rule.

Aspect 10: The method of any of Aspects 1-9, further comprising: determining, based at least in part on receiving a configuration message or deriving a new QoS flow to DRB mapping rule, that a DRB mapping rule associated with a QFI has changed; and refraining from transmitting an end-marker SDAP control PDU on a current DRB associated with the QFI based at least in part on determining that the QFI is not associated with an uplink packet filter.

Aspect 11: The method of any of Aspects 1-10, wherein the UE includes a modem associated with a configuration that does not permit exchanging control information between the modem and the upper layer.

Aspect 12: The method of any of Aspects 1-10, wherein the UE includes a modem associated with a configuration that permits exchanging control information between the modem and the upper layer.

Aspect 13: The method of any of Aspects 1-12, wherein one or more of the uplink ESP packet or the downlink ESP packet is encapsulated in another packet.

Aspect 14: A method of wireless communication performed by a UE, comprising: receiving a downlink ESP packet, wherein the downlink ESP packet is associated with a local IP address, a remote IP address, and a downlink SPI that is not mapped to an uplink SPI; providing, to the upper layer, a query that includes the local IP address, the remote IP address, and the downlink SPI; receiving, from the upper layer, a reply to the query, wherein the reply indicates an uplink SPI paired with the local IP address, the remote IP address, and the downlink SPI associated with the downlink ESP packet; and mapping the downlink SPI associated with the downlink ESP packet with the uplink SPI indicated in the reply to the query.

Aspect 15: The method of Aspect 14, further comprising: creating, based at least in part on the downlink ESP packet, an uplink packet filter that includes an SPI value set to the uplink SPI mapped to the downlink SPI associated with the downlink ESP packet, a destination IP address set to a source IP address in the header of the downlink ESP packet, a source IP address set to a destination IP address in the header of the downlink ESP packet, and a protocol value set to a protocol parameter in the header of the downlink ESP packet; and creating a QoS rule that includes the uplink packet filter, a QFI set to a QFI parameter in an SDAP header of the downlink ESP packet, and a precedence value set to a predefined value.

Aspect 16: The method of Aspect 15, further comprising: receiving an uplink application packet; determining that the uplink application packet includes a set of parameters that matches the uplink packet filter in the QoS rule; and associating the uplink application packet with the QFI in the QoS rule.

Aspect 17: The method of any of Aspects 14-16, wherein the UE includes a modem associated with a configuration that permits exchanging control information between the modem and the upper layer.

Aspect 18: A method of wireless communication performed by a UE, comprising: determining, based at least in part on receiving a configuration message or deriving a new QoS flow to DRB mapping rule, that a DRB mapping rule associated with a QFI has changed; and refraining from transmitting an end-marker SDAP control PDU on a current DRB associated with the QFI based at least in part on determining that the QFI is not associated with an uplink packet filter.

Aspect 19: An apparatus for wireless communication at a device, comprising a processor; memory coupled with the processor; and instructions stored in the memory and executable by the processor to cause the apparatus to perform the method of one or more of Aspects 1-13.

Aspect 20: A device for wireless communication, comprising a memory and one or more processors coupled to the memory, the one or more processors configured to perform the method of one or more of Aspects 1-13.

Aspect 21: An apparatus for wireless communication, comprising at least one means for performing the method of one or more of Aspects 1-13.

Aspect 22: A non-transitory computer-readable medium storing code for wireless communication, the code comprising instructions executable by a processor to perform the method of one or more of Aspects 1-13.

Aspect 23: A non-transitory computer-readable medium storing a set of instructions for wireless communication, the set of instructions comprising one or more instructions that, when executed by one or more processors of a device, cause the device to perform the method of one or more of Aspects 1-13.

Aspect 24: An apparatus for wireless communication at a device, comprising a processor; memory coupled with the processor; and instructions stored in the memory and executable by the processor to cause the apparatus to perform the method of one or more of Aspects 14-17.

Aspect 25: A device for wireless communication, comprising a memory and one or more processors coupled to the memory, the one or more processors configured to perform the method of one or more of Aspects 14-17.

Aspect 26: An apparatus for wireless communication, comprising at least one means for performing the method of one or more of Aspects 14-17.

Aspect 27: A non-transitory computer-readable medium storing code for wireless communication, the code comprising instructions executable by a processor to perform the method of one or more of Aspects 14-17.

Aspect 28: A non-transitory computer-readable medium storing a set of instructions for wireless communication, the set of instructions comprising one or more instructions that, when executed by one or more processors of a device, cause the device to perform the method of one or more of Aspects 14-17.

Aspect 29: An apparatus for wireless communication at a device, comprising a processor; memory coupled with the processor; and instructions stored in the memory and executable by the processor to cause the apparatus to perform the method of Aspect 18.

Aspect 30: A device for wireless communication, comprising a memory and one or more processors coupled to the memory, the one or more processors configured to perform the method of Aspect 18.

Aspect 31: An apparatus for wireless communication, comprising at least one means for performing the method of Aspect 18.

Aspect 32: A non-transitory computer-readable medium storing code for wireless communication, the code comprising instructions executable by a processor to perform the method of Aspect 18.

Aspect 33: A non-transitory computer-readable medium storing a set of instructions for wireless communication, the set of instructions comprising one or more instructions that, when executed by one or more processors of a device, cause the device to perform the method of Aspect 18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, which are configured, individually or in any combination, to:
   store a record including a first set of attributes associated with an uplink encapsulating security payload (ESP) packet sent by an upper layer of the UE, wherein the first set of attributes includes an uplink security parameters index (SPI) included in a header of the uplink ESP packet and a flag comprising a value to indicate that the uplink SPI is not mapped to a downlink SPI;
   receive a downlink ESP packet associated with a second set of attributes and a downlink SPI, wherein the second set of attributes includes the downlink SPI included in a header of the downlink ESP packet; and
   map the uplink SPI with the downlink SPI associated with the downlink ESP packet based at least in part on the record satisfying one or more conditions.

2. The UE of claim 1, wherein the one or more processors, to map the uplink SPI with the downlink SPI associated with the downlink ESP packet, are further configured to:
   update the first set of attributes to include the downlink SPI included in the second set of attributes associated with the downlink ESP packet; and
   update the flag to indicate that the uplink SPI is mapped to a downlink SPI.

3. The UE of claim 1, wherein the one or more conditions include that the first set of attributes satisfies one or more mapping criteria and that any additional record the UE has stored does not satisfy the one or more mapping criteria.

4. The UE of claim 3, wherein the one or more mapping criteria include:
   the first set of attributes having a first local Internet Protocol (IP) address that matches a second local IP address included in the second set of attributes associated with the downlink ESP packet, and
   the first set of attributes having a first remote IP address that matches a second remote IP address included in the second set of attributes associated with the downlink ESP packet.

5. The UE of claim 3, wherein the one or more mapping criteria include the flag having a value to indicate that the uplink SPI is not mapped to a downlink SPI.

6. The UE of claim 3, wherein the one or more mapping criteria include the downlink SPI not being mapped to any uplink SPI.

7. The UE of claim 3, wherein the one or more conditions include that the downlink ESP packet associated with the downlink SPI is received prior to expiration of a timer associated with the record that includes the first set of attributes.

8. The UE of claim 1, wherein the one or more processors are further configured to:
   create, based at least in part on the downlink ESP packet, an uplink packet filter that includes an SPI value set to the uplink SPI mapped to the downlink SPI associated with the downlink ESP packet, a destination Internet Protocol (IP) address set to a source IP address in the header of the downlink ESP packet, a source IP address set to a destination IP address in the header of the downlink ESP packet, and a protocol value set to a protocol parameter in the header of the downlink ESP packet; and
   create a quality of service (QoS) rule that includes the uplink packet filter, a QoS flow identifier (QFI) set to a QFI parameter in a service data adaptation protocol header of the downlink ESP packet, and a precedence value set to a predefined value.

9. The UE of claim 8, wherein the one or more processors are further configured to:
   receive an uplink application packet;
   determine that the uplink application packet includes a set of parameters that matches the uplink packet filter in the QoS rule; and
   associate the uplink application packet with the QFI in the QoS rule.

10. The UE of claim 1, wherein the one or more processors are further configured to:
    determine, based at least in part on receiving a configuration message or deriving a new quality of service (QoS) flow to data radio bearer (DRB) mapping rule, that a DRB mapping rule associated with a QoS flow identifier (QFI) has changed; and
    refrain from transmitting an end-marker service data adaptation protocol (SDAP) control protocol data unit (PDU) on a current DRB associated with the QFI based at least in part on determining that the QFI is not associated with an uplink packet filter.

11. The UE of claim 1, including a modem associated with a configuration that does not permit exchanging control information between the modem and the upper layer.

12. The UE of claim 1, including a modem associated with a configuration that permits exchanging control information between the modem and the upper layer.

13. The UE of claim 1, wherein one or more of the uplink ESP packet or the downlink ESP packet is encapsulated in another packet.

14. A method of wireless communication performed by a user equipment (UE), comprising:
- storing a record including a first set of attributes associated with an uplink encapsulating security payload (ESP) packet sent by an upper layer of the UE, wherein the first set of attributes includes an uplink security parameters index (SPI) included in a header of the uplink ESP packet and a flag comprising a value to indicate that the uplink SPI is not mapped to a downlink SPI;
- receiving a downlink ESP packet associated with a second set of attributes and a downlink SPI, wherein the second set of attributes includes the downlink SPI included in a header of the downlink ESP packet; and
- mapping the uplink SPI with the downlink SPI associated with the downlink ESP packet based at least in part on the record satisfying one or more conditions.

15. The method of claim 14, wherein mapping the uplink SPI with the downlink SPI associated with the downlink ESP packet includes:
- updating the first set of attributes to include the downlink SPI included in the second set of attributes associated with the downlink ESP packet; and
- updating the flag to indicate that the uplink SPI is mapped to a downlink SPI.

16. The method of claim 14, wherein the one or more conditions include that the first set of attributes satisfies one or more mapping criteria and that any additional record the UE has stored does not satisfy the one or more mapping criteria.

17. The method of claim 16, wherein the one or more mapping criteria include:
- the first set of attributes having a first local Internet Protocol (IP) address that matches a second local IP address included in the second set of attributes associated with the downlink ESP packet, and
- the first set of attributes having a first remote IP address that matches a second remote IP address included in the second set of attributes associated with the downlink ESP packet.

18. The method of claim 16, wherein the one or more mapping criteria include the flag having a value to indicate that the uplink SPI is not mapped to a downlink SPI.

19. The method of claim 16, wherein the one or more mapping criteria include the downlink SPI not being mapped to any uplink SPI.

20. The method of claim 16, wherein the one or more conditions include that the downlink ESP packet associated with the downlink SPI is received prior to expiration of a timer associated with the record that includes the first set of attributes.

21. The method of claim 14, further comprising:
- creating, based at least in part on the downlink ESP packet, an uplink packet filter that includes an SPI value set to the uplink SPI mapped to the downlink SPI associated with the downlink ESP packet, a destination Internet Protocol (IP) address set to a source IP address in the header of the downlink ESP packet, a source IP address set to a destination IP address in the header of the downlink ESP packet, and a protocol value set to a protocol parameter in the header of the downlink ESP packet; and
- creating a quality of service (QoS) rule that includes the uplink packet filter, a QoS flow identifier (QFI) set to a QFI parameter in a service data adaptation protocol header of the downlink ESP packet, and a precedence value set to a predefined value.

22. The method of claim 21, further comprising:
- receiving an uplink application packet;
- determining that the uplink application packet includes a set of parameters that matches the uplink packet filter in the QoS rule; and
- associating the uplink application packet with the QFI in the QoS rule.

23. The method of claim 14, further comprising:
- determining, based at least in part on receiving a configuration message or deriving a new quality of service (QoS) flow to data radio bearer (DRB) mapping rule, that a DRB mapping rule associated with a QoS flow identifier (QFI) has changed; and
- refraining from transmitting an end-marker service data adaptation protocol (SDAP) control protocol data unit (PDU) on a current DRB associated with the QFI based at least in part on determining that the QFI is not associated with an uplink packet filter.

24. The method of claim 14, wherein the UE includes a modem associated with a configuration that does not permit exchanging control information between the modem and the upper layer.

25. The method of claim 14, wherein the UE includes a modem associated with a configuration that permits exchanging control information between the modem and the upper layer.

26. The method of claim 14, wherein the upper layer comprises an application layer.

27. The method of claim 14, wherein one or more of the uplink ESP packet or the downlink ESP packet is encapsulated in another packet.

28. The method of claim 27, wherein the other packet in which one or more of the uplink ESP packet or the downlink ESP packet is encapsulated comprises a user datagram protocol (UDP) packet.

29. An apparatus for wireless communication, the apparatus comprising:
- means for storing a record including a first set of attributes associated with an uplink encapsulating security payload (ESP) packet sent by an upper layer of the apparatus, wherein an uplink security parameters index (SPI) is associated with the uplink ESP packet and is included in a header of the uplink ESP packet, and wherein the first set of attributes includes the uplink SPI and a flag comprising a value to indicate that the uplink SPI is not mapped to a downlink SPI;
- means for receiving a downlink ESP packet associated with a second set of attributes and a downlink SPI, wherein the second set of attributes includes the downlink SPI included in a header of the downlink ESP packet; and
- means for mapping the uplink SPI with the downlink SPI associated with the downlink ESP packet based at least in part on the record satisfying one or more conditions.

30. A non-transitory computer-readable medium that stores a set of instructions for wireless communication that, when executed by one or more processors of a user equipment (UE), cause the UE to at least:
- store a record including a first set of attributes associated with an uplink encapsulating security payload (ESP) packet sent by an upper layer of the UE, wherein an uplink security parameters index (SPI) is associated with the uplink ESP packet and is included in a header of the uplink ESP packet, and wherein the first set of attributes includes the uplink SPI and a flag comprising a value to indicate that the uplink SPI is not mapped to a downlink SPI;
- receive a downlink ESP packet associated with a second set of attributes and a downlink SPI, wherein the second set of attributes includes the downlink SPI included in a header of the downlink ESP packet; and
- map the uplink SPI with the downlink SPI associated with the downlink ESP packet based at least in part on the record satisfying one or more conditions.

* * * * *